(12) United States Patent
Turim et al.

(10) Patent No.: US 11,537,588 B2
(45) Date of Patent: *Dec. 27, 2022

(54) SYSTEMS AND METHODS FOR PROVIDING A TWO-WAY, INTELLIGENT TEXT MESSAGING PLATFORM

(71) Applicant: Signal Vine, Inc., Alexandria, VA (US)

(72) Inventors: Jason Turim, Alexandria, VA (US); Roman Cheplyaka, Odessa, UT (US); Brian Kathman, Alexandria, VA (US)

(73) Assignee: Signal Vine, Inc., Alexandria, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/719,030

(22) Filed: Apr. 12, 2022

(65) Prior Publication Data

US 2022/0237168 A1  Jul. 28, 2022

Related U.S. Application Data

(63) Continuation of application No. 15/259,879, filed on Sep. 8, 2016, now Pat. No. 11,327,942.
(Continued)

(51) Int. Cl.
*G06F 16/23* (2019.01)
*H04W 4/14* (2009.01)
(Continued)

(52) U.S. Cl.
CPC .............. *G06F 16/23* (2019.01); *G06Q 10/10* (2013.01); *H04L 12/1859* (2013.01);
(Continued)

(58) Field of Classification Search
None
See application file for complete search history.

(56) References Cited

U.S. PATENT DOCUMENTS

2011/0271203 A1* 11/2011 Fraser .................... G06Q 50/20
715/752
2011/0306028 A1* 12/2011 Galimore ................. G09B 7/00
434/322

OTHER PUBLICATIONS

Castleman et al.; Using Text Messaging to Guide Students on the Path to College; University of Virginia; Sep. 2014 (Year: 2014).*

* cited by examiner

*Primary Examiner* — Lance Leonard Barry
*Assistant Examiner* — Mohammad Yousuf A. Mian
(74) *Attorney, Agent, or Firm* — Nutter McClennen & Fish LLP

(57) ABSTRACT

The present invention provides systems and methods for improved communication management. The present invention provides a platform for providing intuitive, semi-automated, large-scale, two-way text messaging communication between a client or customer (e.g., business or company) and participants/recipients tied to, or otherwise associated or registered with a service provided by the client or customer. The platform provides a consolidated web-based interface with which the client/customer may interact to manage the handling of participant data and to further manage the transmission of targeted outgoing text messages to one or more participants. The web-based interface further allows for the client/customer to automate the handling of an incoming text messages and data associated therewith, including, but not limited to, database updates, creation of automated responses to incoming text messages, and other actions, such as analysis of participant engagement based on participant response and output of engagement metrics.

20 Claims, 40 Drawing Sheets

Related U.S. Application Data

(60) Provisional application No. 62/239,264, filed on Oct. 8, 2015.

(51) Int. Cl.
  *H04L 12/18* (2006.01)
  *H04L 51/02* (2022.01)
  *H04L 51/18* (2022.01)
  *H04L 67/04* (2022.01)
  *H04L 67/12* (2022.01)
  *H04L 67/10* (2022.01)
  *H04M 1/72436* (2021.01)
  *H04L 51/42* (2022.01)
  *H04L 51/58* (2022.01)
  *H04L 51/214* (2022.01)
  *H04L 67/60* (2022.01)
  *G06Q 10/10* (2012.01)
  *H04L 67/02* (2022.01)
  *H04L 67/306* (2022.01)

(52) U.S. Cl.
  CPC .......... *H04L 12/1881* (2013.01); *H04L 51/02* (2013.01); *H04L 51/18* (2013.01); *H04L 51/214* (2022.05); *H04L 51/42* (2022.05); *H04L 51/58* (2022.05); *H04L 67/02* (2013.01); *H04L 67/04* (2013.01); *H04L 67/10* (2013.01); *H04L 67/12* (2013.01); *H04L 67/306* (2013.01); *H04L 67/60* (2022.05); *H04M 1/72436* (2021.01); *H04W 4/14* (2013.01)

FIG. 22

SYSTEMS AND METHODS FOR PROVIDING A TWO-WAY, INTELLIGENT TEXT MESSAGING PLATFORM

CROSS REFERENCE TO RELATED APPLICATIONS

This application is a continuation of U.S. patent application Ser. No. 15/259,879 entitled SYSTEMS AND METHOD FOR PROVIDING A TWO-WAY, INTELLIGENT TEXT MESSAGING PLATFORM filed Sep. 8, 2016, which claims the benefit of, and priority to, U.S. Provisional Application Ser. No. 62/239,264, filed Oct. 8, 2015, the contents of each of which is incorporated by reference herein in its entirety.

FIELD OF THE INVENTION

The present disclosure relates generally to communication management, and, more particularly, to a platform for providing intuitive, semi-automated, large-scale, two-way text messaging communication between participants registered with a service and the provider of said service.

BACKGROUND

In today's competitive environment, access to immediate information is crucial. With continual advancements in communication technologies, many have become accustomed to, and even expecting, access to instantaneous information and the ability to be constantly available to others. Short Message Service (SMS) is rapidly becoming the messaging medium of choice for larger and larger segments of the public. SMS is a text messaging service utilizing standardized communications protocols for the exchange of text messages to mobile devices, specifically mobile or cellular phones. Accordingly, SMS enables users of mobile devices the benefits of the often limited functions from the world of paging, email, and instant messaging.

The advent of digital cellular, and more particularly SMS, provides numerous benefits to the wireless world that were previously unavailable, thus aiding the population's need for constant information and constant availability. Text messaging is a fast and convenient way to communicate short messages between users of mobile devices. There are also information services that use text messaging to deliver content of interest (e.g., news, weather, sports, financial markets, entertainment) to a base of subscribers. Accordingly, SMS broadcasting is a widely used technology, with more and more companies and service providers communicating to their customers via SMS.

SUMMARY

The present invention provides a platform for providing intuitive, semi-automated, large-scale, two-way text messaging communication between a client or customer (e.g., business or company) and participants/recipients tied to, or otherwise associated or registered with a service provided by the client or customer. The platform provides a consolidated web-based interface with which the client/customer may interact to manage the handling of participant data and to further manage the transmission of text messages to one or more participants. The web-based interface further allows for the client/customer to automate, or semi-automate, the handling of incoming text messages and data associated therewith, including, but not limited to, database updates, creation of automated responses to incoming text messages, and other actions, such as analysis of participant engagement based on participant response and output of engagement metrics.

The platform is generally configured to create profiles for each participant based on input of participant data input as well as ongoing collection of participant data via receipt of incoming text message responses from participant's. The web-based interface allows for one or more users associated with the client/customer to create and schedule outbound messages to be sent to targeted participants. The outbound messages are two-way capable, in that, a participant is able to respond to an outgoing text message by sending an incoming response text message, at which point, the platform is then configured to provide an automated response management approach in addressing participant responses and handling of participant data based on the participant responses.

In particular, the platform is configured to receive an incoming participant's response text message and perform one or more reactive actions based on an analysis of the participant's response. In some embodiments, the platform includes an automated response system configured to perform an automatic action in response to the incoming message. For example, the platform may be configured to take one or more actions in response to the participant's response text message, wherein the actions may be determined by predefined rules or protocols set by one or more users associated with the client/customer. The platform may be configured to update a participant's profile with data derived from the response text message, as well as further determine whether additional outgoing messages are required in response. By continually updating a participant's profile, certain participants may no longer fall within the specific participant profile variables, and thus may no longer receive automated messages originally targeting them, while additional information may be required for other participants. As such, the platform may be configured to determine whether additional outgoing messages are required in response and thus generate automated outgoing messages to be sent to the participant so as to elicit more data from the participant.

Additionally, or alternatively, in some embodiments, the platform is configured to route the incoming text message to an inbox provided in the web-based interface, at which point one or more users associated with the client/customer have the ability to review the participant's response message and determine whether they wish to reply directly to the participant.

In one aspect, the present invention provides a system for providing intuitive, semi-automated management of communication data received from one or more mobile devices over a large-scale two-way communications platform. The system includes a server configured to communicate and exchange communication data with one or more mobile devices over a network. The server includes a hardware processor coupled to non-transitory, computer-readable memory containing instructions executable by the processor to cause the server to provide a web-based platform having an interface with which authorized users associated with a client or customer providing a service can interact for the management of communications to and from mobile devices of participants registered with the service. The server is further configured to receive, in response to an outgoing communication message, an incoming communication message from a mobile device of a participant to which the outgoing communication message was delivered. The outgoing communication message includes data including a question or request for an answer or information from the participant and the incoming communication message data includes an answer or information in response to the question or information request of the outgoing communication message. The server is further configured to update a participant profile stored in a participant database on-the-fly with the incoming communication message data and analyze the updated participant profile to determine one or more actions to be performed.

In some embodiments, the analysis of the updated participant profile generally includes a comparison of participant profile data variables with predefined criteria associated with one or more outgoing communication messages scheduled to be transmitted to one or more target participants for eliciting participant response. The predefined criteria may include, for example, a set of requested participant data.

The server is configured to automatically perform one or more of a first set of actions based on a positive correlation of the participant profile data variables with the predefined criteria. A positive correlation of participant profile data variables with the predefined criteria occurs when the participant data falls within the scope of the requested participant data. Upon positive correlation, the server is configured to determine whether all requested participant data or a portion of the requested participant data has been received. In the event that all request participant data has been received, the server is configured to automatically remove the participant from a list of targeted participants, as that participant has met their requirements as far as answering questions or providing information. In the event that only a portion of the request participant data has been received, the server is configured to automatically schedule the transmission of one or more outgoing communication messages to the mobile device of the participant to elicit additional participant response.

The server is configured to automatically perform one or more of a second set of actions based on a lack of correlation of the participant profile data variables with the predefined criteria. A lack of correlation of participant profile data variables with the predefined criteria occurs when the participant data falls outside the scope of the requested participant data. Upon lack of correlation, the server is configured to automatically schedule the transmission of one or more outgoing communication messages to the mobile device of the participant to elicit participant response for requested participant data. Additionally, or alternatively, the server is configured to provide an alert to an authorized user indicating that the received incoming communication message from the participant lacks correlation with the requested participant data of the delivered outgoing communication message.

In some embodiments, the incoming and outgoing communication messages are text messages, such that the server is configured to transmit and receive the text messages via a short message service (SMS). Additionally, or alternatively, in some embodiments, at least one of the incoming and outgoing communication messages may include at least one data file including, but not limited to, an image file, a video file, an audio file, a document file, and a combination thereof. As such, the server may be configured to receive or transmit the incoming and outgoing communication messages, respectively, via a multimedia messaging service (MMS).

Research and experience have shown text messaging to be one of the most effective ways to reach and interact with certain populations, particularly in instances in which participant response and engagement is important. In one example, the client or customer may generally provide a service related to college and/or career counseling services targeting prospective students (e.g., high school juniors and/or seniors) or current students. The platform is configured to manage the transmission and receipt of SMS text messages to and from students in an intuitive manner so as to improve student engagement with the service. The research-driven intelligence of the platform can ensure each message is relevant for each student, delivering a personalized experience to keep students engaged and on track. The platform enables a client/customer to use existing data to ensure the right text reaches the right student at the right time, improving outcomes such as college attainment, persistence, attendance and more.

The present invention provides numerous advantages over current systems. The platform's functionality targets high-volume, large participant interactive communications in which data can inform the timing and content of a message to make it highly relevant to participants. Accordingly, the intelligent text messaging platform of the present invention delivers high participant engagement and statistically significant outcomes, thereby empowering customers/clients to leverage text messaging to produce real results and engagement in a cost-effective way.

BRIEF DESCRIPTION OF THE DRAWINGS

Features and advantages of the claimed subject matter will be apparent from the following detailed description of embodiments consistent therewith, which description should be considered with reference to the accompanying drawings.

FIGS. 14-23 are screenshots of the message management interface further illustrating a workflow of a user being alerted to an ambiguous or otherwise unrecognizable participant response and the user further inferring intent of the participant.

FIG. 39 is screenshot of the user interface provided by the platform illustrating the workspace portal including a dashboard interface for providing metrics related to participant engagement and the like.

Figure 1:
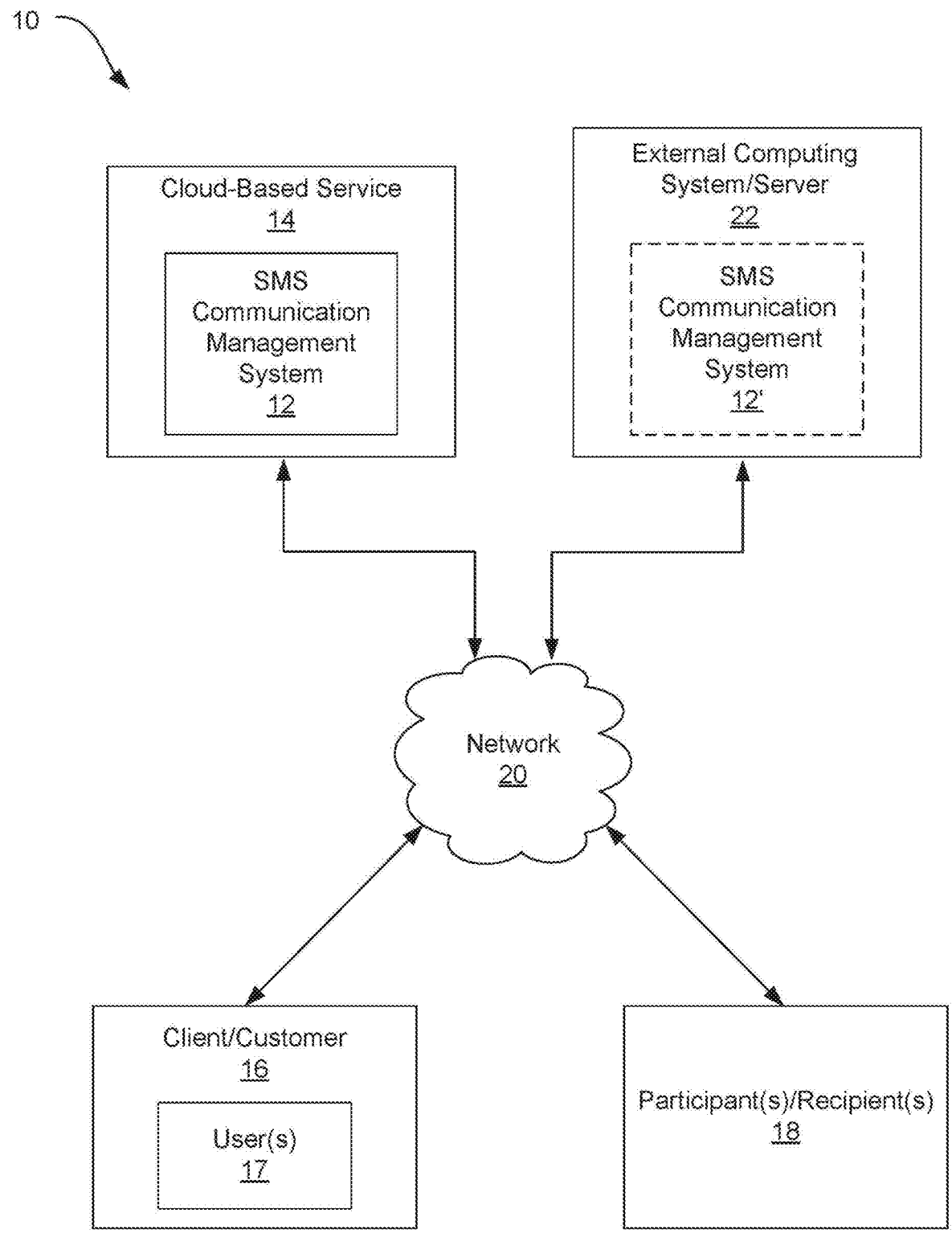
FIG. 1 is a block diagram illustrating one embodiment of an exemplary system for providing an SMS communication management platform between a client/customer and one or more participants associated with the client/customer.

For a thorough understanding of the present disclosure, reference should be made to the following detailed description, including the appended claims, in connection with the above-described drawings. Although the present disclosure is described in connection with exemplary embodiments, the disclosure is not intended to be limited to the specific forms set forth herein. It is understood that various omissions and substitutions of equivalents are contemplated as circumstances may suggest or render expedient.

DETAILED DESCRIPTION

By way of overview, the present invention provides systems and methods for providing a short message service (SMS) platform for providing intuitive, semi-automated, large-scale, two-way text messaging communication between a client or customer (e.g., business or company) and participants/recipients tied to, or otherwise associated with, the client or customer.

The platform provides a consolidated web-based interface with which the client/customer may interact to manage the handling of participant data and to further manage the transmission of targeted outgoing text messages as well as the receipt of incoming text messages from a participant. The web-based interface further allows for the client/customer to automate the handling of an incoming text messages and data associated therewith, including, but not limited to, database updates, creation of automated responses to incoming text messages, and other actions, such as analysis of participant engagement based on participant response and output of engagement metrics.

The platform is generally configured to create profiles for each participant based on input of participant data input as well as ongoing collection of participant data. The web-based interface allows for one or more users associated with the client/customer to create and schedule automated outbound messages to be sent to targeted participants based, at least in part, on specific participant profile variables or criteria, as determined by the client/customer. Accordingly, outbound messages can be personalized to a targeted subset of participants, as opposed to a single, massive text message to all participants. The outbound messages are two-way capable, in that, a participant is able to respond to an outgoing text message by sending an incoming response text message, at which point, the platform is configured to provide hybrid-like response management approach in addressing participant responses. In particular, the platform is configured to route a participant's response text message to an inbox provided in the web-based interface, at which point one or more users associated with the client/customer have the ability to review the participant's response message and determine whether they wish to reply directly to the participant and/or further direct an automatic action to be taken by the platform's automated response system. For example, in some embodiments, in addition to allowing for a user to directly respond, the platform may be configured to take one or more actions in response to the participant's response text message. The one or more actions may be determined by predefined rules or protocols set by one or more users associated with the client/customer. For example, the platform may be configured to update a participant's profile with data derived from the response text message, as well as further determine whether additional outgoing messages are required in response. By continually updating a participant's profile, certain participants may no longer fall within the specific participant profile variables, and thus may no longer receive automated messages originally targeting them.

In some instances, a participant's response text message may be unclear, in that their response does not fall within the confines of the allowable (or recognizable) response (e.g., yes, no, etc.). Accordingly, the web-based interface provides such unclear responses for one or more users associated with the client/customer to review and specify the participant's intent. For example, the platform may flag, or otherwise mark, the incoming participant message indicating the message is unclear. At this point, one or more users associated with and having access to the participant are able to intervene and use human intuition to decipher and determine a participant's intent in their response. The platform may include machine learning and /or natural processing technologies so as to learn and subsequently infer intent for future incoming text messages from the participant, based on the user's intervention for any unclear text messages. Accordingly, rather than being limited to a fully automated response system, the platform of the present invention provides a hybrid-like response approach which combines the benefits of an automated process with the insight of a human.

The present invention provides numerous advantages over current systems. The platform's functionality targets high-volume, large participant interactive communications in which data can inform the timing and content of a message to make it highly relevant to participants. Accordingly, the intelligent text messaging platform of the present invention delivers high participant engagement and statistically significant outcomes, thereby empowering customers/clients to leverage text messaging to produce real results and engagement in a cost-effective way.

It should be noted that the systems and platform described herein may utilize other communication standards and may not rely solely on SMS for the transmission of messages. For example, in some embodiments, in addition, or alternatively, to communicating text messages, the platform 12 of the present invention may be configured to utilize multimedia messaging service (MMS) for the transmission and receipt of multimedia content (e.g., images, video, audio, etc.). Accordingly, the platform of the present invention may further allow for the sending and receiving of multimedia content, in addition to text messages, to and from participants. It is further contemplated that other messaging channels may also be provided by a platform of the present invention (e.g., social media messaging applications and the like).

The following description includes exemplary embodiments of the present invention in which the SMS platform is utilized by a client or customer associated with student related services, such as, for example, college and/or career counseling services targeting prospective students (e.g., high school juniors and/or seniors) or current students. However, it should be noted that embodiments of the SMS platform described herein may be used by clients/customers providing other types of services and is not limited to the examples described herein.

Accordingly, as described in greater detail herein, the SMS platform of the present invention is configured to manage the transmission and receipt of SMS text messages to and from students (e.g., also referred to herein as "participants" and/or "recipients" interchangeably) in an intuitive manner so as to improve student engagement with the service. The research-driven intelligence of the platform can ensure each message is relevant for each student, delivering a personalized experience to keep students engaged and on track. The platform enables a client/customer to use existing data to ensure the right text reaches the right student at the right time, improving outcomes such as college attainment, persistence, attendance and more.

FIG. 1 illustrates one embodiment of an exemplary system 10 consistent with the present disclosure. As shown, the system 10 includes an SMS communication management system (or platform) 12 embodied on an internet-based computing system/service. For example, as shown, the platform 12 may be embodied on a cloud-based service 14, for example. The platform 12 is configured to communicate and share data with a client/customer 16 (comprising one or more users 17, described in greater detail herein) and one or more participants/recipients 18 over a network 20. More specifically, the platform 12 provides a consolidated web-based interface (described in greater detail herein) with which the client/customer 16 may interact to manage the handling of participant data and to further manage the transmission of targeted outgoing text messages as well as the receipt of incoming text messages from a participant. The platform 12 is further configured to transmit and receive outgoing and incoming text messages to and from one or more targeted participants 18, as determined by predefined, automated messaging protocols and/or personalized messaging by the users 17 of the client/customer 16. Accordingly, the users 17 may utilize any known web-enabled computing device configured to communicate with the platform 12 and further access the user interface provided thereon. The one or more participants 18 may generally utilize a mobile device configured to send and receive SMS text messages.

The system 10 may further include an external computing system/server 22 configured to communicate with at least the cloud-based service 14, and subsequently the platform 12, via the network 20. The external computing system/server 22 may be embodied as a remote server, for example, for communicating with the platform 12 and for performing the other functions described herein. Similarly, in some embodiments, the platform 12' may be embodied on the external computing system/server 22. In the embodiments described herein, the external computing system/server 22 may be embodied as a remote server having one or more databases associated with the platform 12, as will be described in greater detail herein.

The network 20 may represent, for example, a communications protocol associated with, or otherwise configured to transmit data associated with, a short message service (SMS). Accordingly, the network 20 may be any network that carries data via SMS protocols. Non-limiting examples of suitable networks that may be used as network 20 include various second generation (2G), third generation (3G), fourth generation (4G) cellular-based data communication technologies, Wi-Fi wireless data communication technology, the internet, other networks capable of carrying data, and combinations thereof. In some embodiments, network 20 is chosen from the internet, at least one wireless network, at least one cellular telephone network, and combinations thereof. As such, the network 20 may include any number of additional devices, such as additional computers, routers, and switches, to facilitate communications. In some embodiments, the network 20 may be or include a single network, and in other embodiments the network 18 may be or include a collection of networks.

Figure 2:
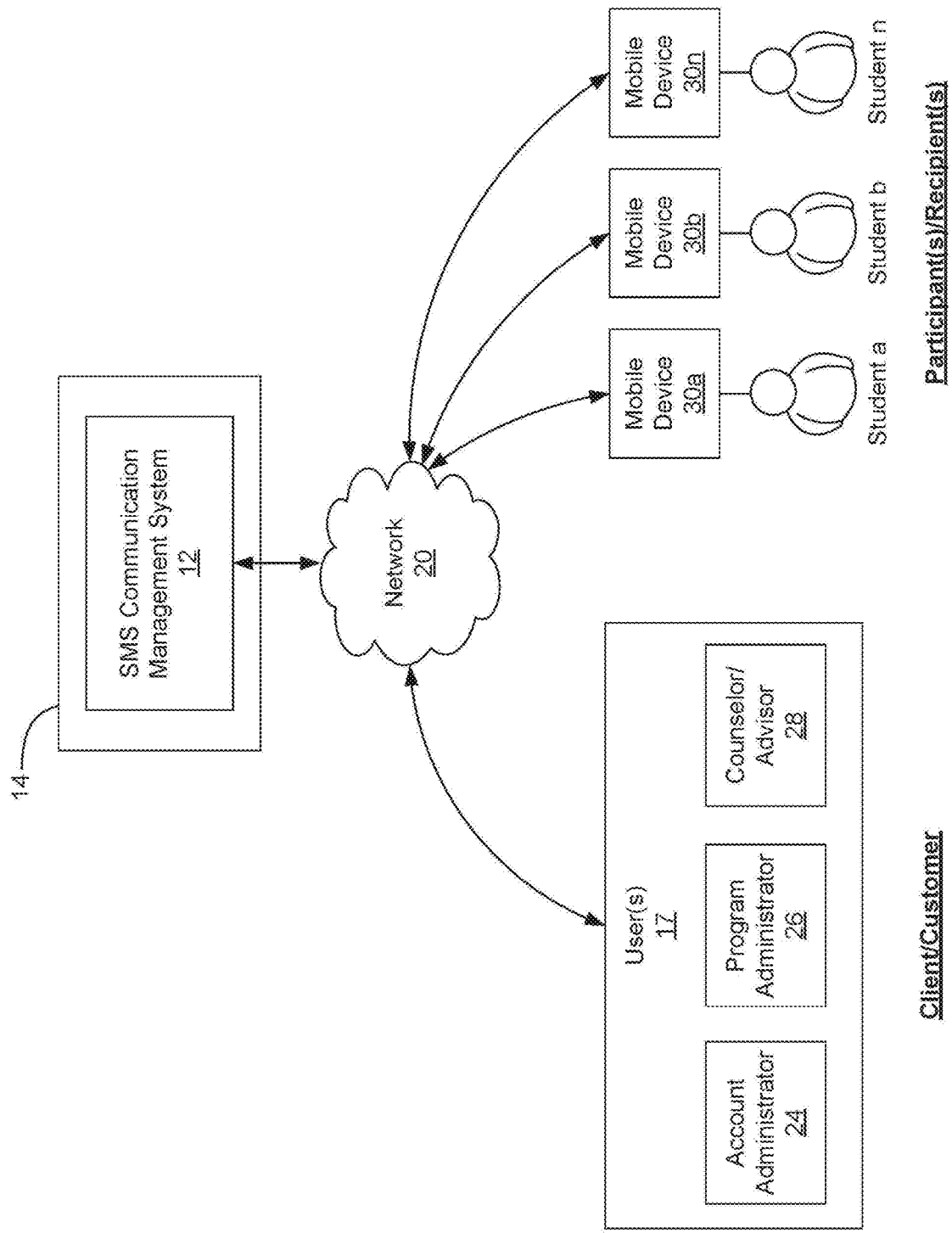
FIG. 2 is a block diagram illustrating the system of FIG. 1 in greater detail.

FIG. 2 is a block diagram illustrating the system 10 of FIG. 1 in greater detail. As previously described, one specific example includes the client/customer 16 being associated with student related services, such as, for example, college and/or career counseling services. Accordingly, the users 17 may include staff members or individuals employed by the client/customer 16, such as, for example, an account administrator 24, a program administrator 26, and a counselor/advisor 28. Each of the different users 17 may generally have different levels of access to the participant data and different levels of data manipulation capabilities (e.g., editing participant data, editing automated outgoing messages, editing automated response messages, etc.). Furthermore, depending on a user's role, their level of access may be limited to a confined set of data. For example, a counselor/advisor 28 may only be allowed to access a subset of participants to which they were assigned, while an account administrator 24 has full access and editing capabilities to all participants and associated messaging data.

The users 17 may generally access the platform 12 and exchange data therewith via the network 20 by any known computing device so as to further access the user interface provided by the platform 12. For example, at least one of the user devices may be embodied as, without limitation, a computer, a desktop computer, a personal computer (PC), a tablet computer, a laptop computer, a notebook computer, a mobile computing device, a smart phone, a cellular telephone, a handset, a messaging device, a work station, a distributed computing system, a multiprocessor system, a processor-based system, and/or any other computing device configured to store and access data, and/or to execute software and related applications consistent with the present disclosure.

In keeping with the above example of the client/customer 16 being associated with student related services, the one or more participants 18 include students (student a through student n). The students are able communicate with the platform 12 via any know mobile device (shown as mobile devices 30a-30n) configured to receive and send SMS text messages via the network 20. For example, the mobile devices 30 may be embodied as, without limitation, a smart phone or cellular telephone.

It should be noted that, for sake of simplicity and ease of description, the illustrations of FIGS. 1 and 2 (and FIGS. 3 and 4) show direct pathways of communication between the SMS communication management system 12 and either of the client/customer 16 and participant/recipient 18. However, as generally understood, such pathways of communication between the SMS communication management system 12 and either of the client/customer 16 and participant/recipient 18 may include multiple hops between a user's or participant's mobile device 30, for example, and the SMS communication management system 12. Such a communication network or pathway is generally illustrated in FIG. 2A, described in greater detail herein.

Figure 2A:
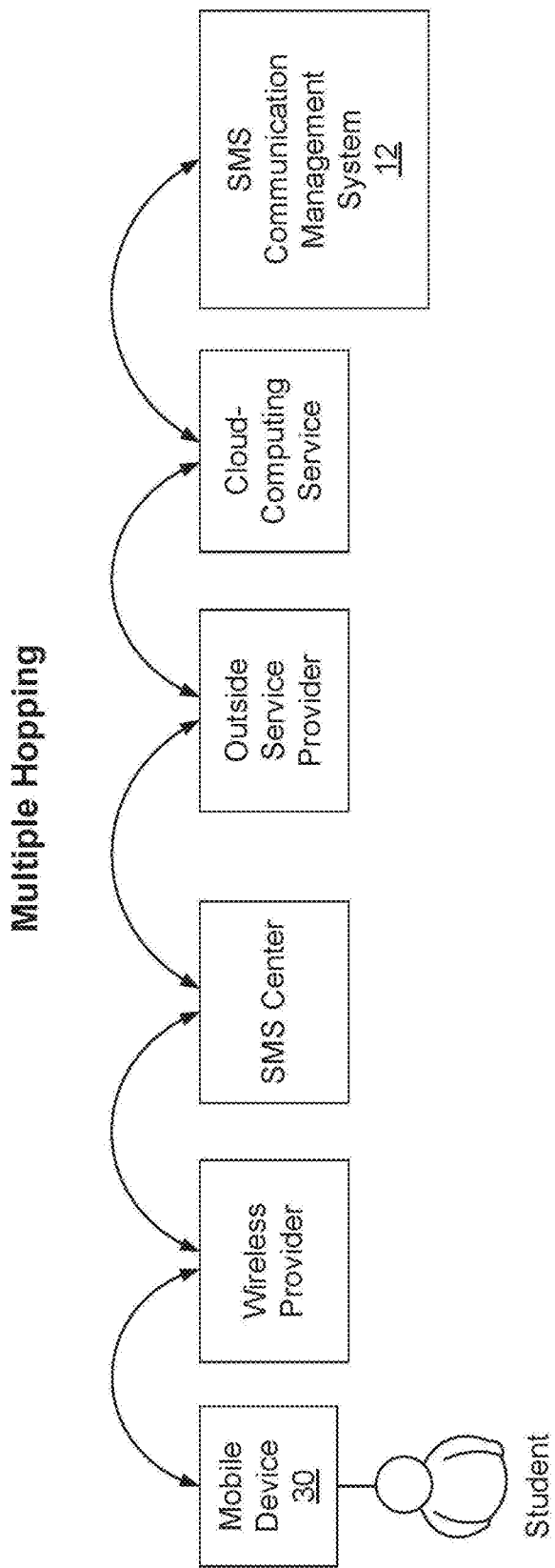
FIG. 2A is a block diagram illustrating one embodiment of a communication network for allowing communication and exchange of data between the SMS communication management platform and the mobile devices of one or more participants.

Referring to FIG. 2A, a block diagram illustrates one embodiment of a communication network for allowing communication and exchange of data between the SMS communication management platform 12 and the mobile devices 30 of one or more participants 18. As shown, the communication pathway includes multiple intermediaries for receiving and relaying data (in a multiple hopping fashion) transmitted between the mobile device 30 and the SMS communication management platform 12.

For example, the communication pathway may include a wireless provider. The wireless provider may include, for example, mobile network operator or MNO, also known as a wireless service provider, wireless carrier, cellular company, or mobile network carrier. The communication pathway may further include a Short Message service center (SMSC), which generally servers as a network element in a cellular network and capable for storing, forwarding, converting, and delivering SMS messages. The tasks of an SMSC can be described as: reception of SMS messages (e.g., text messages) from wireless network users; storage of text messages; forwarding of text messages; delivery of text messages to wireless network users; and maintenance of unique time stamps in text messages. When a message is sent, the message gets stored in the SMSC which delivers it to the destination user when they are available (a store and forward option). The SMSC may also be responsible for handling the SMS operations of a wireless network. For example, when an SMS message is sent from a mobile phone, it will reach an SMSC first, and then the SMSC forwards the SMS message towards the destination. Accordingly, the main function of an SMSC is to route SMS messages and regulate the process. In the event that a recipient is unavailable (for example, when the mobile phone is switched off), the SMSC will store the SMS message and will forward the SMS message when the recipient is available and the message's expiry period is not exceeded.

The communication pathway may further include an outside service provider for providing technology and business services to a mobile network operator to enable the operator to provide their subscribers with access to voice calling, messaging, data and other services as users move across networks around the world. Such an outside service provider may include SYNIVERSE, for example. The communication pathway may further include a cloud-computing service provider. The cloud-computing service provider may be configured to provide web service APIs, for example, to allow software developers, and the like, to programmatically make and receive phone calls and send and receive text messages using the cloud-computing service offered. It should be noted that the multiple hopping communication pathway illustrated in FIG. 2A is merely exemplary and may include only some of the intermediaries described herein.

Figure 3:
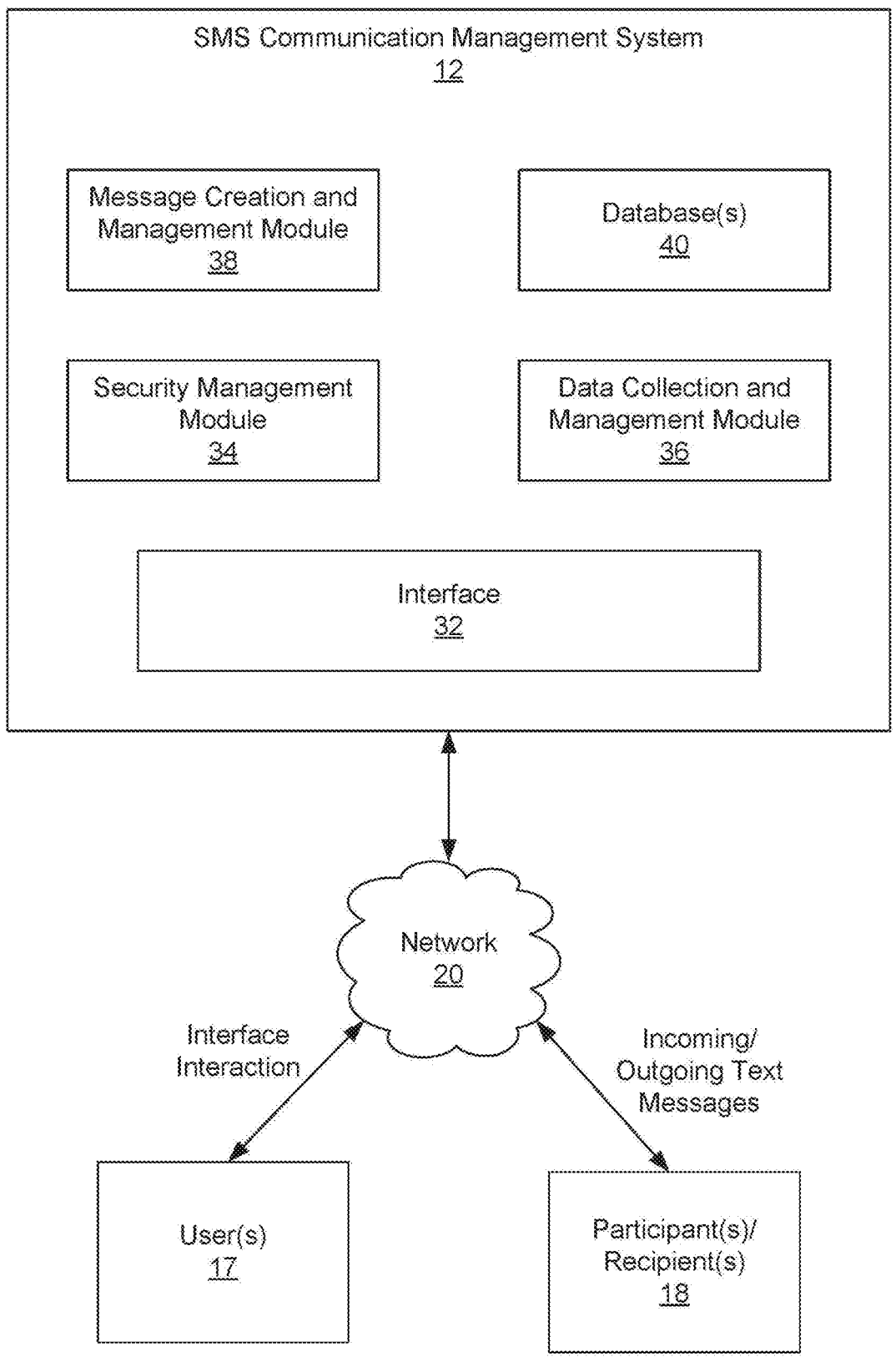
FIG. 3 is a block diagram illustrating at least one embodiment of a SMS communication management platform in greater detail.

FIG. 3 is a block diagram illustrating at least one embodiment of a SMS communication management platform 12 in greater detail. As shown, the platform 12 may include an interface 32, a security management module 34, a data collection and management module 36, a message creation and management module 38, and one or more databases 40 for storage of data associated with the one or more users 17, participants 18, messages (sent, received, and scheduled to send), automated message programs (e.g., automated outgoing programs, automated response programs, etc.), and the like.

The platform 12 provides users 17 (upon passing a security verification process) with a web-based interface 32 with which the users 17 may interact so as to manage the handling of student data and to further manage the transmission of targeted outgoing text messages as well as the receipt of incoming text messages from a student. The web-based interface 32 further allows users 17 to automate the handling of an incoming text messages and data associated therewith, including, but not limited to, database updates, creation of automated responses to incoming text messages, and other actions, such as analysis of student engagement based on student response and output of engagement metrics. As will be described in greater detail herein, particularly with regard to screenshots of FIGS. 9-39, the interface 32 generally provides a portal including various interfaces (e.g., message management interface, program interface, participant interface, dashboard metrics interface, tools interface) providing users 17 with the ability to view and/or manipulate or interact with message, participant, and message program data (depending on the user's access level or security clearance).

Figure 4:
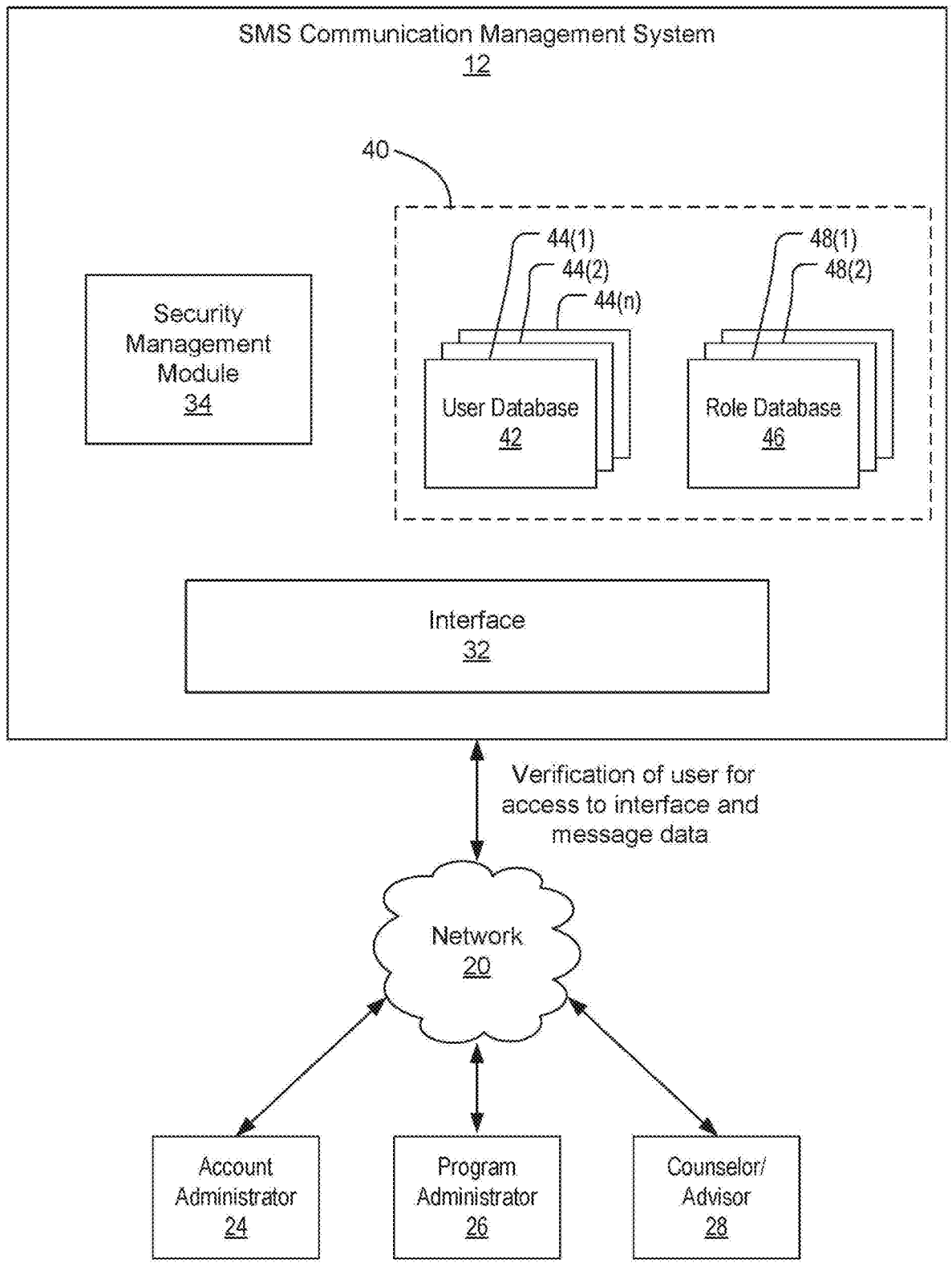
FIG. 4 is a block diagram illustrating the security management module provided by the SMS communication management platform in greater detail.

FIG. 4 is a block diagram illustrating the security management module 34 provided by the SMS communication management platform 12. The security management module 34 includes authentication and access architecture based on relationship groups that align users 17 with one or multiple groups depending on the users 17 role (e.g., account administrator, program administrator, and counselor/advisor). For example, as part of the authentication and access architecture, the platform 12 is configured to screen a user 17 attempting to access the interface 32 by verifying the credentials of the user 17 and determining whether they are registered with the platform 12, and, if so, will provide said user 17 with an interface limiting access to only the data to which the verified user 17 is permitted. For example, the verification process may include a typical login scenario in which a user must log in to the platform 12 by providing credentials (e.g., username, password, etc.), wherein the platform 12 will compare the credentials with a user database 42 composed of user profiles 44(1)-44(n) to determine whether the user is allowed access. The platform 12 may be configured to collect an identity of a user requesting access, characteristics of the user requesting access, the type of access requested, identity and characteristics of message or student data requested to be accessed, and a combination thereof. The characteristics of the user requesting access may include, for example, user credentials, user role with respect to the account, user assignment to one of a plurality of programs in the account, and a combination thereof. The security management module 34 may then compare the collected data against user profiles 44 so as to determine whether the user may have access to the specific data they are attempting to access.

Upon gaining access to the platform 12, the interface 32 may generally provide a user with a portal or workspace. As generally understood, the portal or workspace is in the form of an interface (e.g., but not limited to graphical user interface (GUI)) provided on the user's computing device through which a user may interact with the platform 12. The user interface 32 provides consistent access to data and information that a specific user is permitted to have access to. For example, user access to data may be limited based on user credentials (e.g., role-based access). For example, the platform 12 may further utilize a role database 46 which includes a number of role profiles 48(1)-48(n) for trusted users, in which users may have limited roles, as previously described. Accordingly, the portal displayed to a counselor/advisor 28 may provide limited access to message communication-related information, as well as message management tools and options, due to the role of the counselor/advisor 28. Alternatively, the portal displayed to an account administrator 24 may provide full access to all message communication-related information and further provide all message management tools and options.

As previously described, users 17 are different than participants 18, in that the users 17 are generally responsible for monitoring and managing messaging programs via the web-based interface 32 application. The different users 24-28 have different responsibilities to a messaging program. For example, an account administrator 24 may be able to view and manage all programs and participants in an account. Administrators may further have the ability to invite users to the web application (with account administrator permissions or lower), and they can view and revoke all account users access to the application. Account administrators 24 may generally have all permissions available to users at a lower access level. A program administrator 26 may be able to view and manage specific programs and their associated participants in an account. The program administrator 26 may further be able to invite users to the web application (with Program administrator permissions or lower). They can view and revoke access to any user with access to the programs they administer. They have all permissions available to users at a lower access level. A counselor/advisor 28 may have access to a subset of participants in a specific program. The counselor/advisor 28 may further be able to send messages, and update the participant profile for those participants to which they have access.

Accordingly, presentation of information on the portal or workspace may be focused on the required actions and information generated related to those actions to support the user in completing actions without putting the burden on the user to find items that need attention. As will be described in greater detail herein, the portal or workspace may present the users with one or more message management interface, program interface, participant interface, dashboard metrics interface, tools interface, and further allow the user to navigate the different portals/workspaces (shown in FIGS. 9-39) to view specific information or utilize tools.

Figure 5:
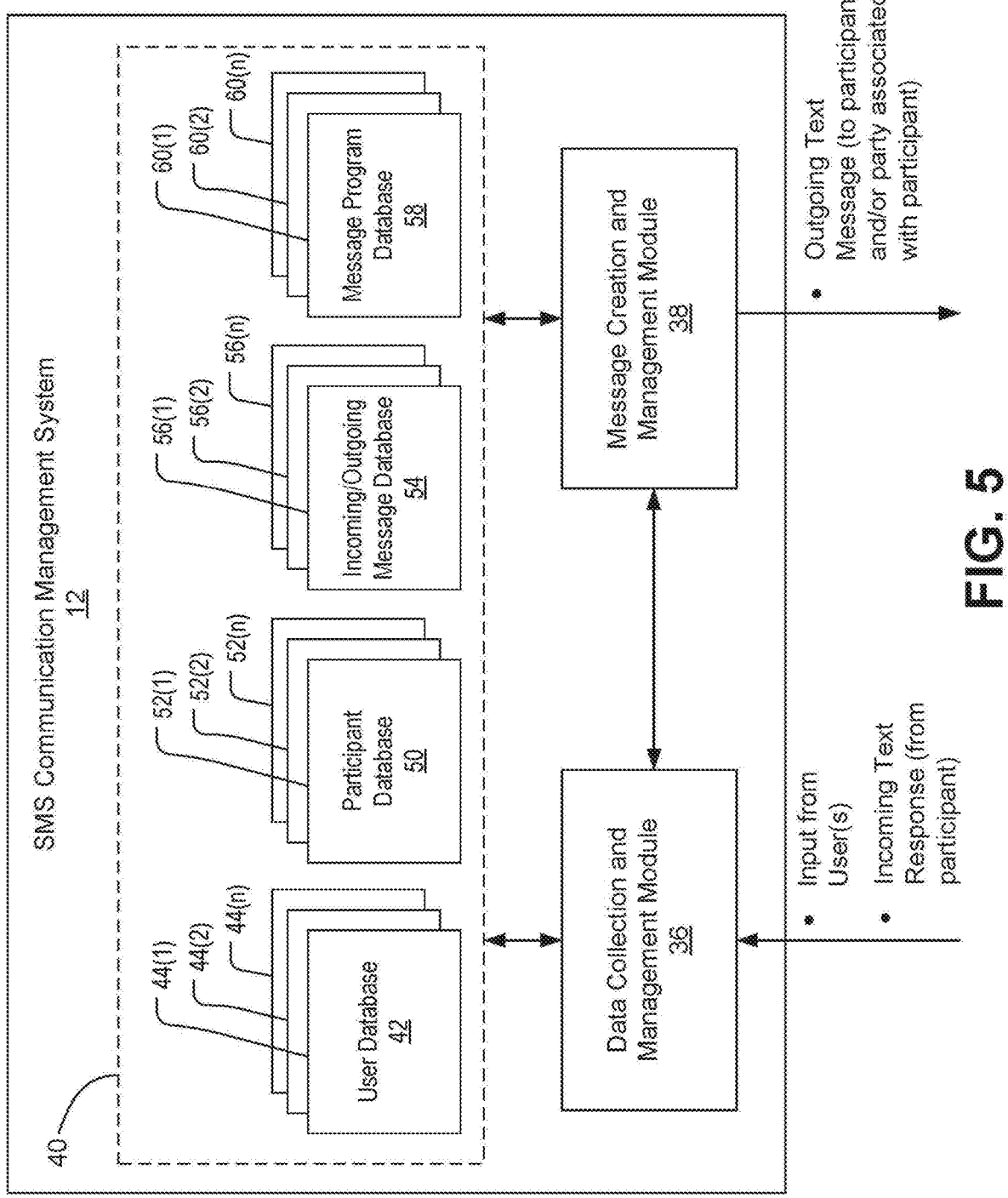
FIG. 5 is a block diagram illustrating the data collection/management and message creation/management modules provided by the SMS communication management platform in greater detail and their interaction with databases storing data associated with the one or more user and participant profiles, messages (sent, received, and scheduled to send), and automated message programs (e.g., automated outgoing programs, automated response programs, etc.).

FIG. 5 is a block diagram illustrating the data collection/management module 36 and the message creation/management module 38 in greater detail and their interaction with databases 40 storing associated with the one or more user and participant profiles, messages (sent, received, and scheduled to send), and automated message programs (e.g., automated outgoing programs, automated response programs, etc.). As will be described in greater detail herein, the data collection/management module 36 is configured to receive data, including, but not limited to, input data from one or more users 17, as well as data associated with incoming text message responses from students 18 and further manage the updating of databases 40. The message creation/management module 38 is configured to provide users 17 with a means of creating or editing at least one of personalized and automated outgoing scheduled text messages, personalized and automated response text messages, personalized on-the-fly text messages, and the like.

The cornerstone of the SMS communication management platform 12 of the present invention is the ability to schedule a set of messages to be sent to one or more participants in a program. The ability to automate targeted communications takes the guesswork out of communicating with participants at scale, and allows client/customer 16 to focus their resources engaging interested participants. As previously described, the web-based interface 32 allows for one or more users 17 to create and schedule automated outbound messages to be sent to targeted participants based, at least in part, on specific participant profile variables or criteria. Accordingly, the message creation/management module 38 is configured to interact with a participant database 50, comprising participant profiles 52(1)-52(n), and at least a message program database 58, comprising various message program profiles 60(1)-60(n), so as to create a program specific message based on specific participant data.

Each program defines a set of data points (a schema) that are collected about each of the enrolled participants. In order to enroll in a program, a participant record or profile must include values for each element in the program schema; (these names and values make up a participant's profile and provide the basis not only for message personalization, but also conditional messages). Accordingly, a participant profile 52 may include data relevant to the context of the service provided by the client/customer 16. For example, in this instance of the service being related to college and/or career counseling services targeting prospective students (e.g., high school juniors and/or seniors) or current students, the data in the participant profile may include basic information such as name, date of birth, residence or zip code, phone number, email, grade level, GPA, as well as more detailed information such as group or program to which they are assigned, and details surrounding college specifics such as application status, financial aid status, scholarship status, SAT score, FAFSA completion status, and the like.

Each program can contain zero or more datasets. Datasets are simple key-value stores that contain information relevant to all participants in a program. Typically, the keys in a dataset are defined in a program's schema, so data can be looked up for each participant. For example, a dataset may contain a set of registration locations keyed on zip code. The field zip code is part of the program schema, and each participant has their zip code in their profile, so the program can look up the registration location for a given participant based on their zip.

The client/customer 16, and, in some instances, one or more users 17, may define specific program messages. The message definitions include one or more of the following data: date and time the message is to be sent they are to be sent; criteria that determine which participants receive the message; and personalized message content. Once the client/customer 16 has defined the messages, they are imported into the message program database 58 via a proprietary program definition language (PDL), as will be described in greater detail herein.

The platform 12 provides customers the ability to send messages at scale, and interact with their constituents via an easy to use, familiar desktop interface modeled after an email client. The PDL is used to describe how the platform 12 should schedule, personalize, and respond to SMS messages. Specifically, the PDL is a proprietary domain specific language (DSL) that uses JSON or YAML to create an abstract syntax tree that is evaluated periodically to inform the application on what actions to take. PDL expressions are evaluated by another piece of proprietary software (Lispy) configured to provide a simple type system for messaging programs. The PDL has two major sections that are used to define the messaging program; 1) the outgoing message definitions; and 2) incoming message handlers. A developer utilizes the Lispy expressions (or constants) to define the properties of an outbound message, send time, recipients, and content. Another important aspect of the outbound message definition is its ability to load an incoming message handler (message listener). Handlers describe actions that are to be performed when messages are received. Each handler evaluates a Lispy expression to determine which actions to perform. A common example is to take an action based on the content of received message, but any Lispy expression that evaluates to a Boolean value can be used to determine which action to take. The PDL of the present invention is configured to support one or more of the following actions: send a message to the person that sent the received message; update a field in the sender's profile; join a security group; leave a security group; send a message to someone other than the participant; update a profile field on a related participant; flag message; enroll/un-enroll the sender in a program; stop/start receiving messages; and a combination thereof.

Handlers are loaded when messages are sent out, and unloaded after taking action on a received message. There is also a specialized set of handlers (Global Handlers) which are loaded for the duration of the program, and fire whenever a message is received, before any message specific handlers. Global handlers can perform the exact same actions as message handlers, the only difference is the duration for which they are loaded.

In order to encourage engagement, the platform 12 includes a complex set of message personalization features which ensure the relevancy of message content and timing. For example, the platform 12 may allow for the creation of conditional messaging. Program messages may be sent to active, enrolled participants so long as they meet the message criteria. The client/customer 16 may define message criteria for each program message while designing the program. Message conditions can be blank, meaning the message goes to all participants in the program, or the conditions can be set based on any one or more participant profile variables that determine which participants to send the program message. For example, a program message with a condition of age=25 and location=New York will only be sent to those participants who both have the value 25 in their age variable and New York in their location variable. Each message can contain any number of conditions, and it will be sent so long as the condition evaluates to 'true' for a given participant.

Figure 6:
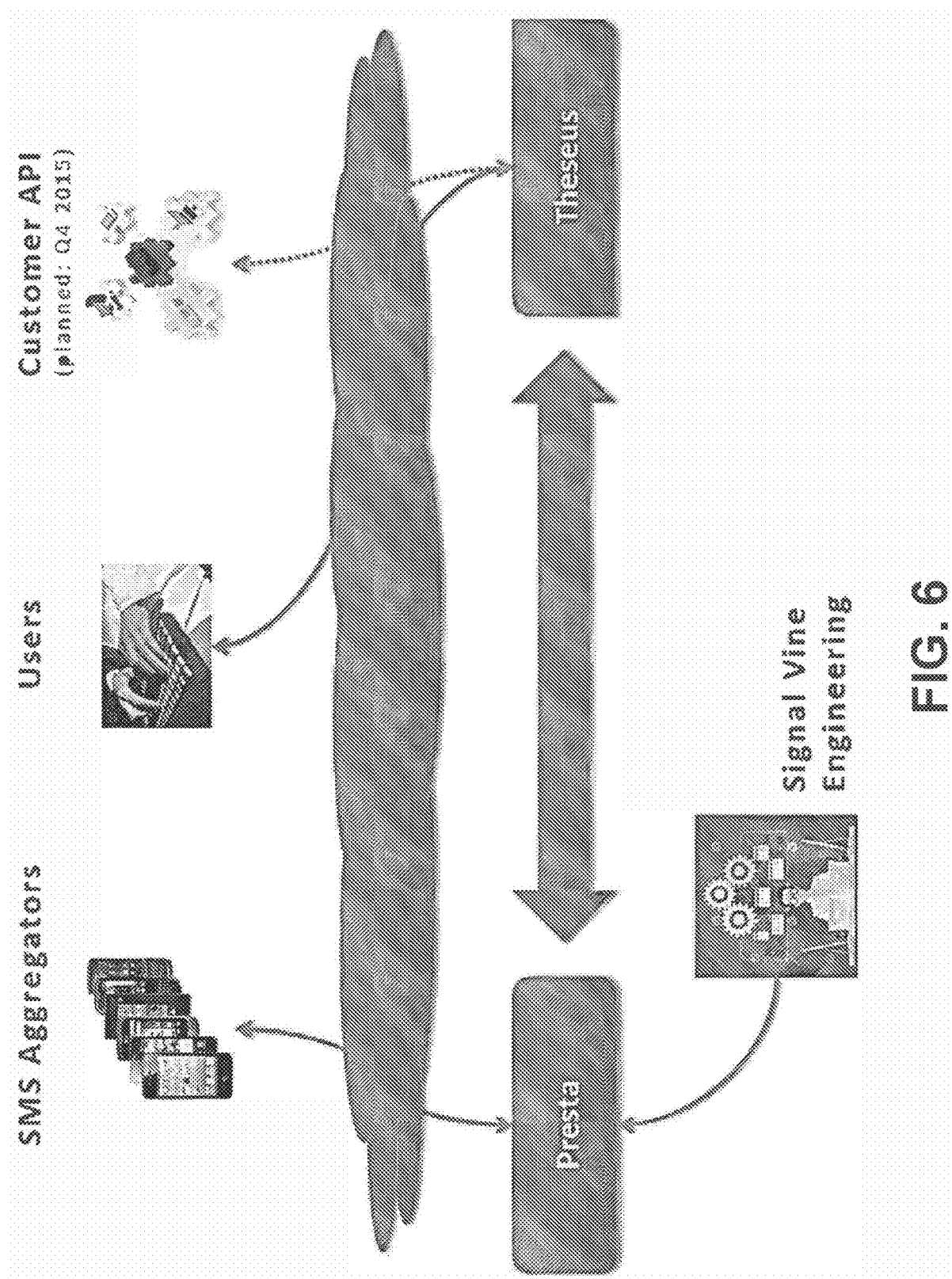
FIGS. 6-8 are block diagrams illustrating one embodiment of data collection consistent with the present disclosure.
Figure 7:
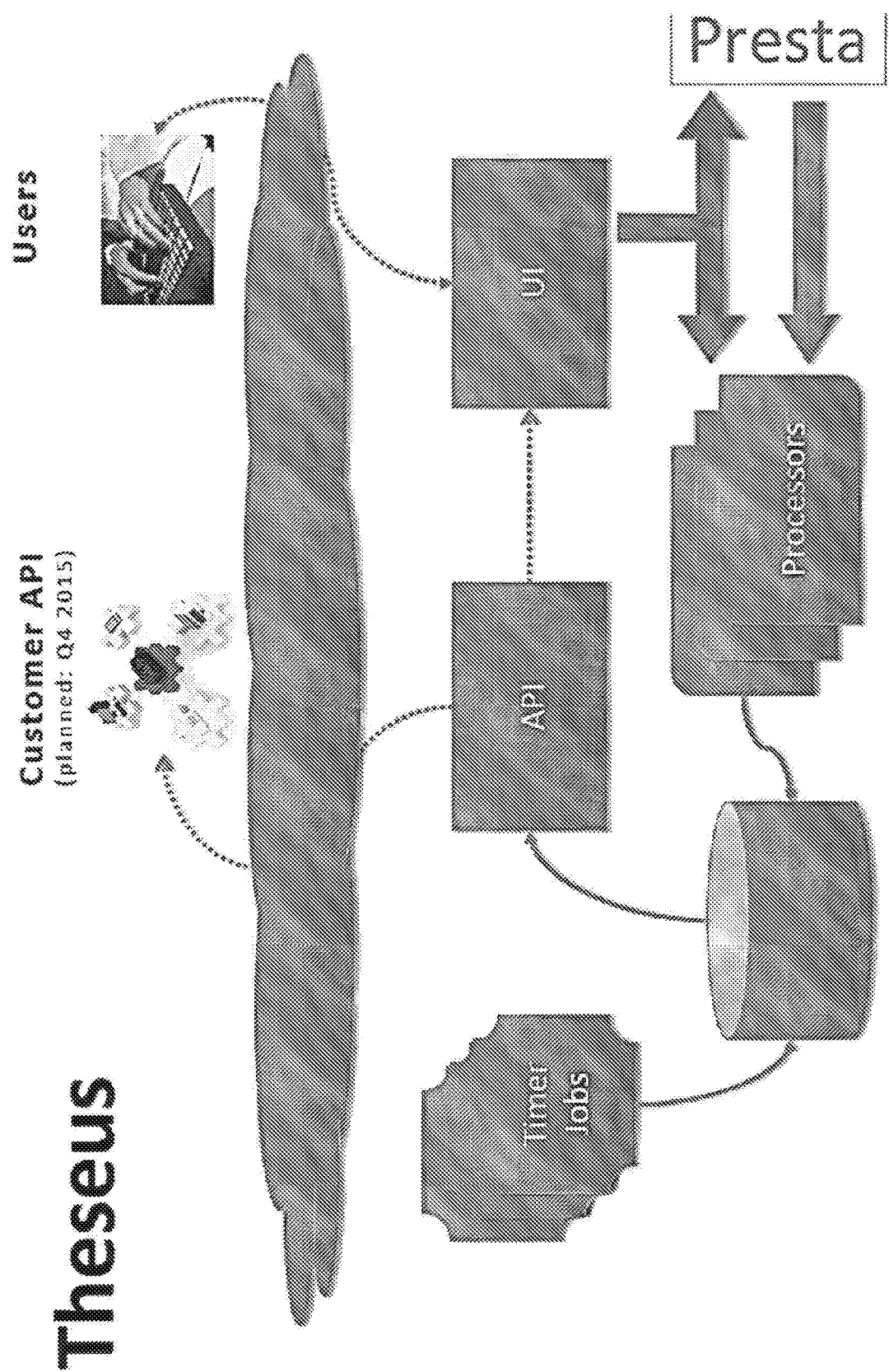
Figure 8:
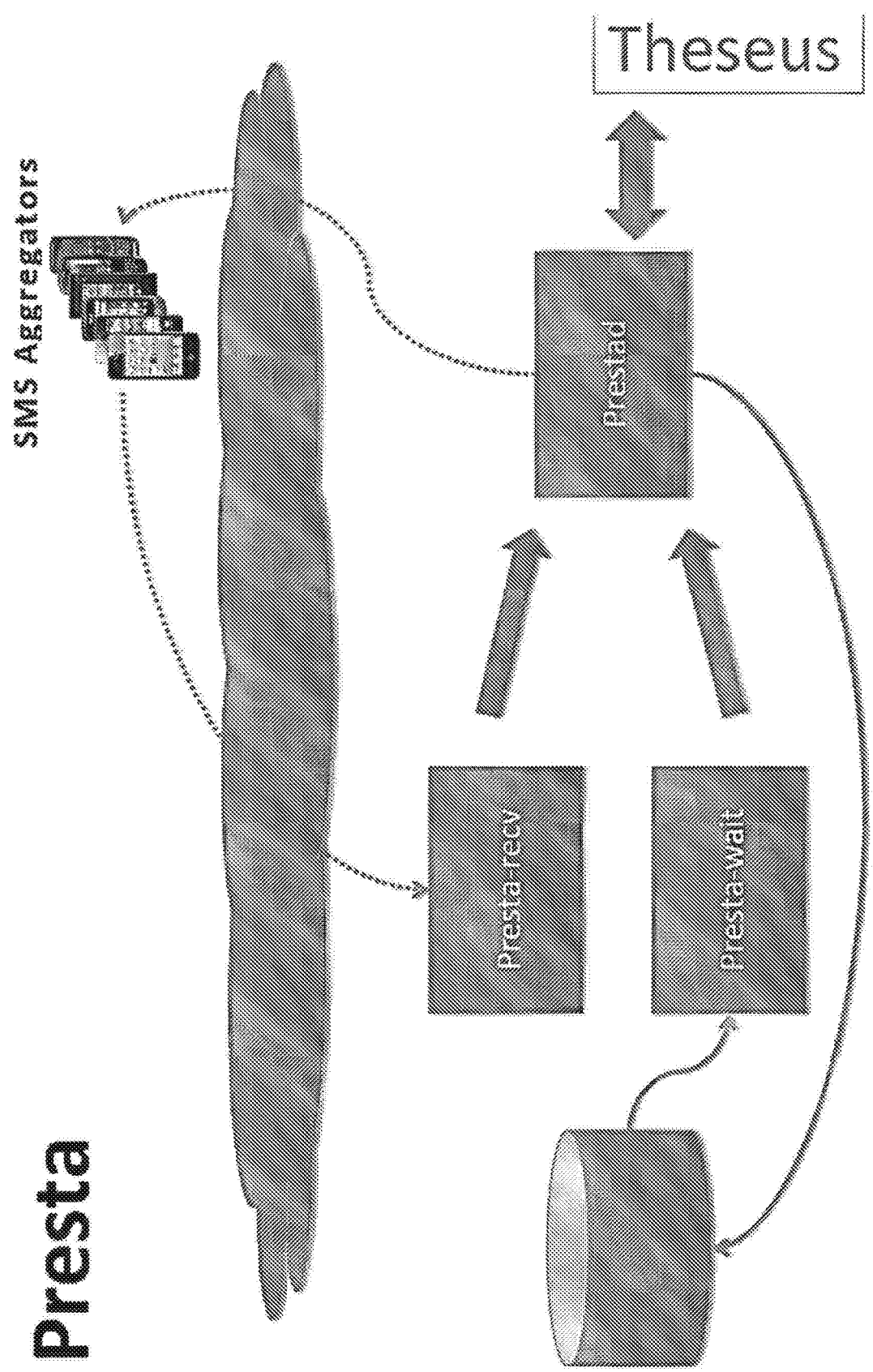
Figure 9:
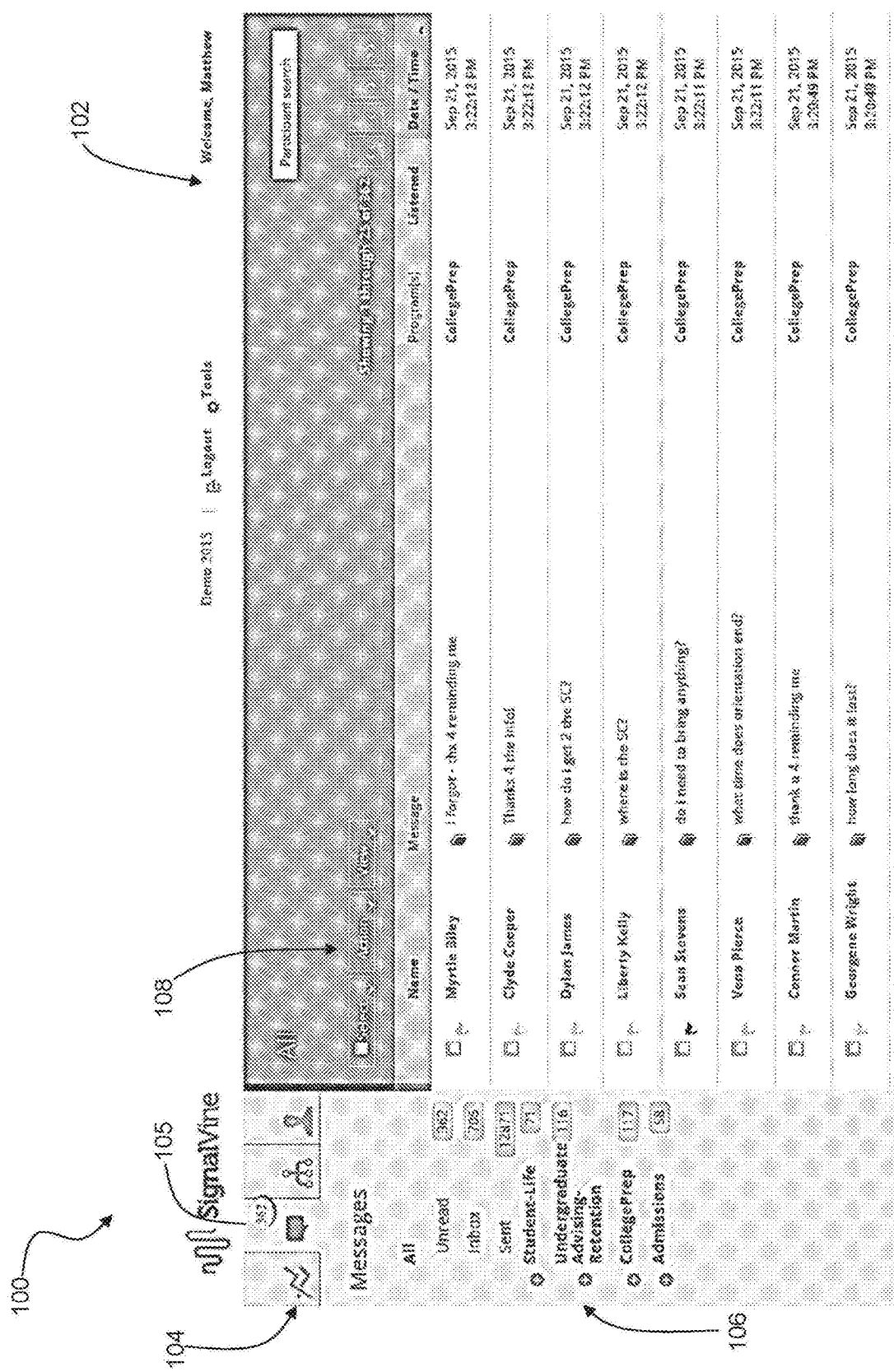
FIGS. 9-13 are screenshots of the user interface provided by the platform illustrating the workspace portal including a message management interface for providing users with the ability to view (via an inbox) and/or interact with message data between participants and users.

FIGS. 6-8 are block diagrams illustrating one embodiment of data collection consistent with the present disclosure. Data may be collected via a number of independent applications that communicate asynchronously via an AQMP compliant message bus. FIGS. 6-8 illustrate high level architecture diagrams enumerates various software components. Theseus is a set of technologies that end-users (human or machine) interact with and Presta is a set of technologies that are used to create/schedule & send the SMS messages. Both Theseus and Presta communicate asynchronously using an AQMP compliant message bus. Each of these components is further broken down into various application daemons that also communicate via the same mechanism.

As previously described, outbound messages are two-way capable, in that, a participant is able to respond to an outgoing text message by sending an incoming response text message, at which point, the platform is configured to provide hybrid-like response management approach in addressing participant responses. In particular, the platform is configured to route a participant's response text message to the inbox provided in the web-based interface, at which point one or more users associated with the client/customer have the ability to review the participant's response message and determine whether they wish to reply directly to the participant and/or further direct an automatic action to be taken by the platform's automated response system. For example, in some embodiments, in addition to allowing for a user to directly respond, the platform may be configured to take one or more actions in response to the participant's response text message. The one or more actions may be determined by predefined rules or protocols set by one or more users associated with the client/customer. For example, the platform may be configured to update a participant's profile with data derived from the response text message, as well as further determine whether additional outgoing messages are required in response. By continually updating a participant's profile, certain participants may no longer fall within the specific participant profile variables, and thus may no longer receive automated messages originally targeting them.

The platform 12 may also allow for the creation of reactive programs. For example, a messaging program can take actions based on incoming messages. The platform 12 provides for complete control over what events to react to, and what actions to take in response to those events. Typically, the programs listen for participant responses and provide relevant, automated responses to message when they are understood. The platform 12 further supports a wide-range of other actions including updating the participant's profile, or sending a text message to a third party such as a mentor or parent. The platform 12 also allows for the personalization of message content. Program messages can be personalized with data from a participant's profile or a program dataset.

Accordingly, every message is unique, well-timed, and relevant to each student. Student information is continually updated so as to drive message personalization based on the most recent data available. Participant profiles are used and referenced so as to customize text content, timing of delivered messages, and filter who receives which message. The messages can be scheduled around key milestones, dates, and information.

Furthermore, the message creation/management module 38 is configured to account for student responses and the data associated therewith, which can trigger automatic pre-programmed follow-ups and/or alert users to intervene if an incoming message is unclear. For example, in some instances, a participant's response text message may be unclear, in that their response does not fall within the confines of the allowable (or recognizable) response (e.g., yes, no, etc.). Accordingly, the web-based interface provides such unclear responses for one or more users associated with the client/customer to review and specify the participant's intent. For example, the platform may flag, or otherwise mark, the incoming participant message indicating the message is unclear. At this point, one or more users associated with and having access to the participant are able to intervene and use human intuition to decipher and determine a participant's intent in their response. The platform may include machine learning and /or natural processing technologies so as to learn and subsequently infer intent for future incoming text messages from the participant, based on the user's intervention for any unclear text messages. Accordingly, rather than being limited to a fully automated response system, the platform of the present invention provides a hybrid-like response approach which combines the benefits of an automated process with the insight of a human.

FIGS. 9-13 are screenshots of a portal 100 provided by the provided by the web-based interface 32 which may be tailored to a specific user for presenting message data between users and participants, as well as security posture management tools and options. As generally understood, the portal 100 is in the form of an interface (e.g., but not limited to graphical user interface (GUI)) provided on the user's computing device through which a user may interact with the platform 12.

As shown, the portal 100 generally provides an initial banner 102 in which a user's identity may be presented, as well as other details (e.g., access level, etc.). The portal 100 further provides the various interfaces 104 for providing relevant information. As shown in FIGS. 9-13, for example, the current interface is selected is a message management interface 105 for providing users with the ability to view (via an inbox) and/or interact with message data between participants and users. As shown, student text messages are routed into a personalized, web-based inbox for each counselor of staff member, allowing the counselor to read the student's message just like checking Web email. Accordingly, students can text replies to advisors and administrators, rather than a blast response text. The ability to send and receive messages is a key component of the platform 12. Users are able view messages in a web-based application with a familiar mailbox style interface. This allows our customers to interact with participants at scale, unencumbered by small screens and virtual keyboards.

It should be noted that the inbox is different than the typical inbox that is generally associated with email applications and the like. For example, typical inbox formats are commonly limited to a single user logged into the email application and thus having sole access and interaction with the inbox and the contents provided. The inbox of the present invention allows for simultaneous access by multiple users, such that any actions taken for a given message (e.g., reading of incoming text message responses, replies sent, etc.) and/or updating of data, such as a participant's profile, can be seen in real- or near real-time by all users logged into the simultaneous inbox. While the platform 12 may generally allow for multiple users to view certain message content in the simultaneous inbox, the access levels still dictate who can and cannot interact with certain participant data and messages (e.g., counselor 1 is limited to their set of participants and counselor 2 is limited to their set of participants, but both counselors can be logged into the simultaneous inbox).

Figure 10:
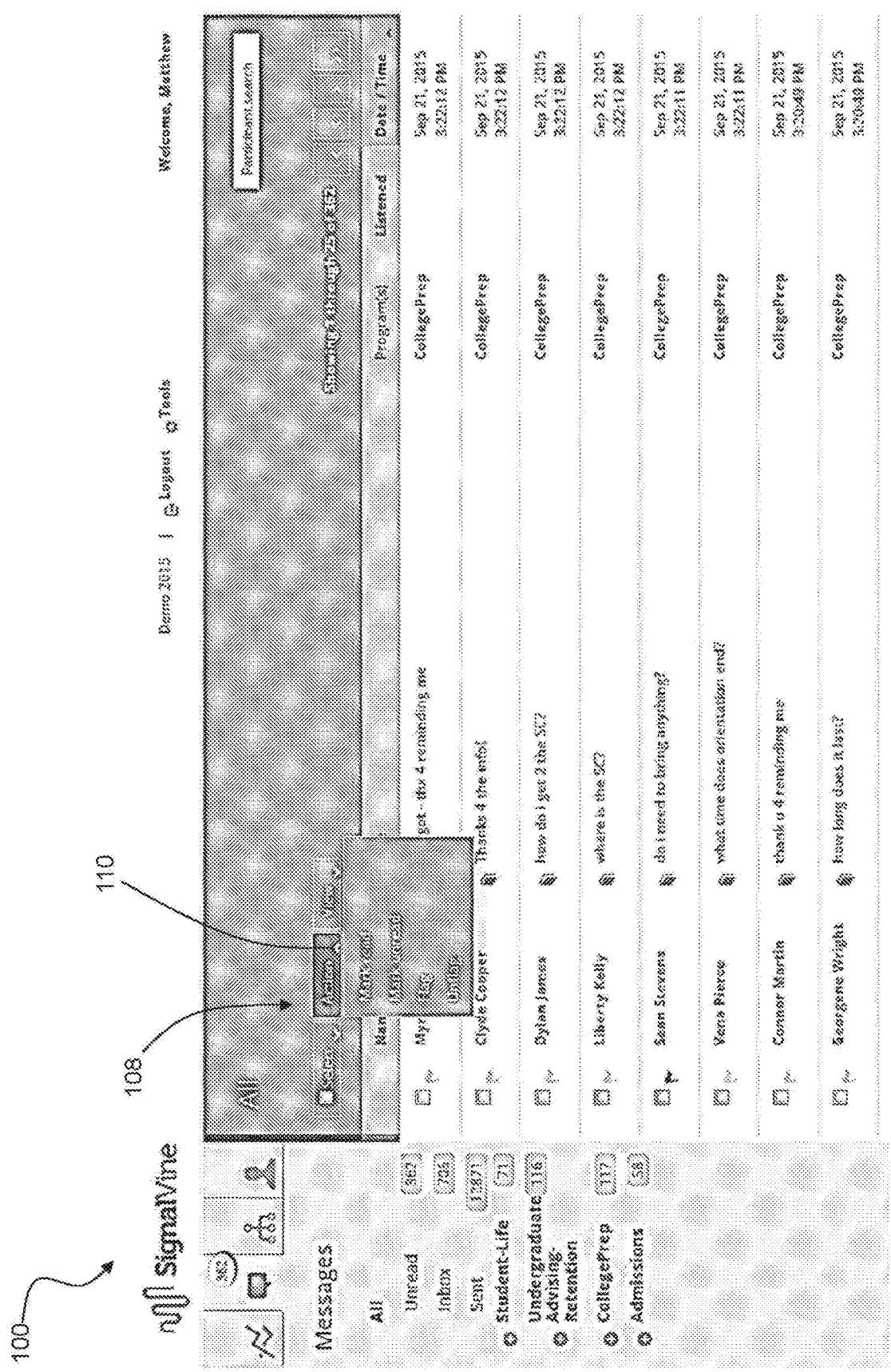
Figure 11:
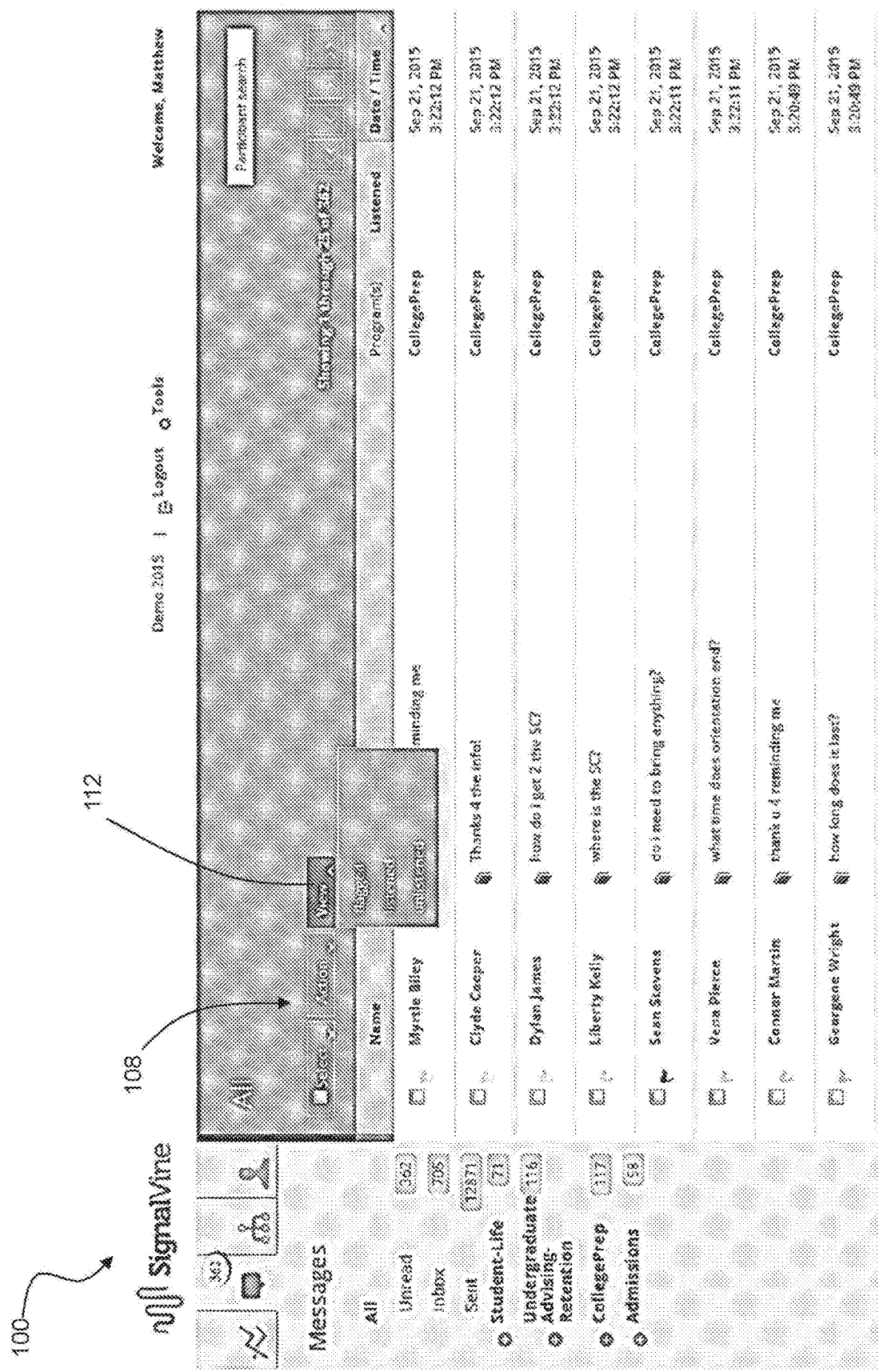

A user may be presented with a list of programs 106 from which they may filter out messages based on the program selected. The portal 100 further provides tools 108 for allowing certain actions to be taken for any given message. For example, as shown in FIG. 10, actions 110 may be taken, such as marking a message as read or unread, as well as flagging or unflagging a message. FIG. 11 illustrates additional view tools 112 for manipulate the presentation of text messages (differentiating between flagged, listened, unlistened). Messages are unread until the user explicitly marks it read, either from the inbox or the conversation view. Messages in the inbox can be marked as a priority by selecting a UI element next to the message. Flagged messages can be viewed in a message list. Users can be notified when inbox message levels exceed a certain point, or based on any other customized trigger for notification so messages are not overlooked or not responded to in a timely manner.

The platform 12 can send 160-character text messages (SMS) or multimedia messages (MMS) to any supported US mobile number from a pre-determined long-code (10-digit number) or leased short-code (4-6 digit number). The platform 12 can receive inbound 160-character text messages (SMS) or multimedia messages (MMS) from any supported US mobile number. Inbound SMS text messages are collected and displayed using an email inbox metaphor, where they can easily switch between viewing all messages received, only unread messages. Users access their inbox screen upon logging into the application.

Figure 12:
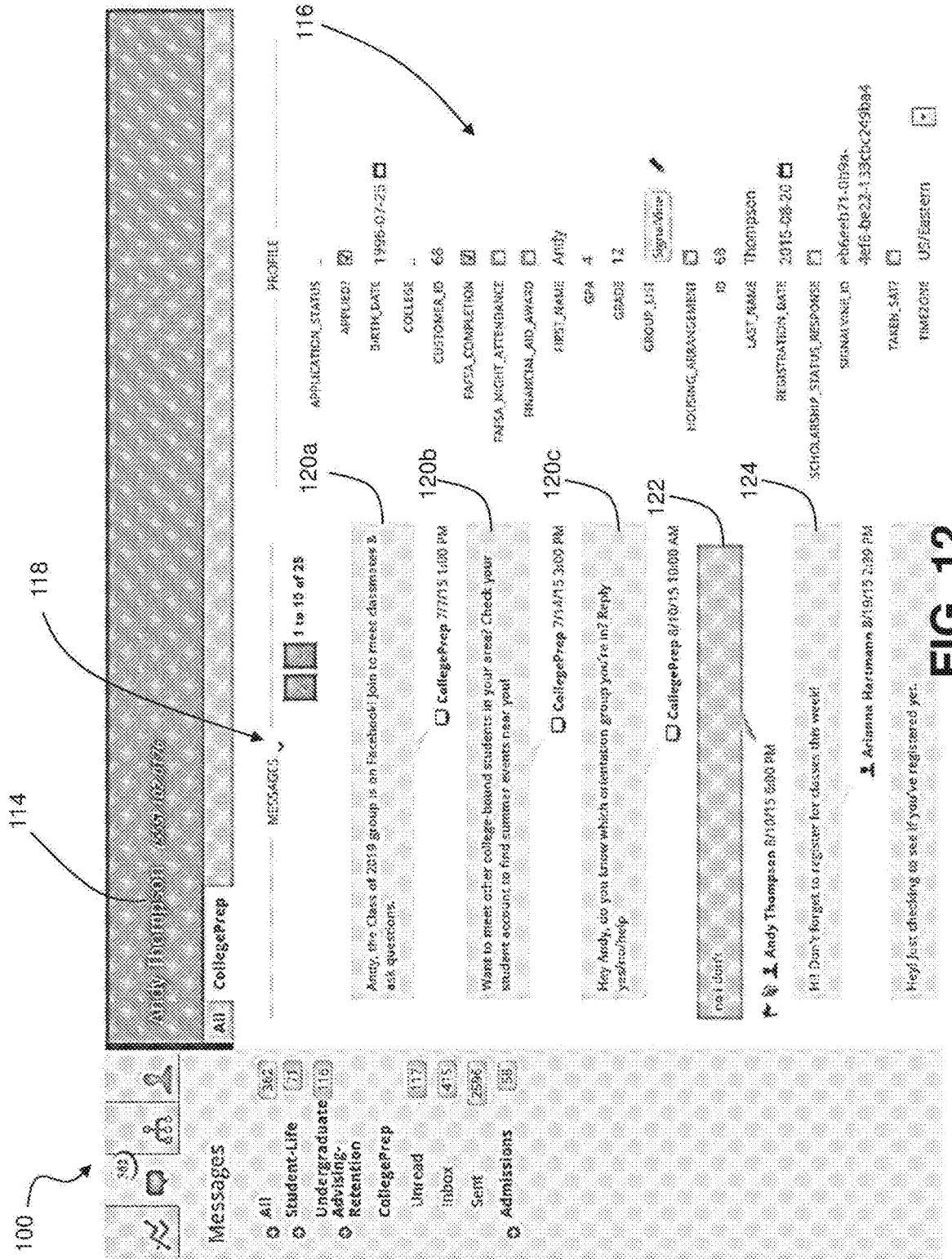

The message management interface 105 allows for the viewing and manipulation of messages (both sent and received), and, in some instances, the creation of personalized response messages to the student. For example, as shown in FIG. 12, users with the appropriate permission can view participant's 114 message history for a program. Upon selected a specific participant, the portal 100 provides a view of the participant's profile data 116, as well as the message history 118. Within the view for each individual participant detail view (also referred to as the participant message view), next to the message conversation 118 is the participant profile 116. The profile is unique to each program, separated by tabs within the page, therefore making program-specific data only viewable to those users who have access to both the participant and the program where the data is being captured and managed. Participant profiles can contain any number of variables, all of which are customizable by name and function. Users have access to view and edit each variable.

Figure 13:
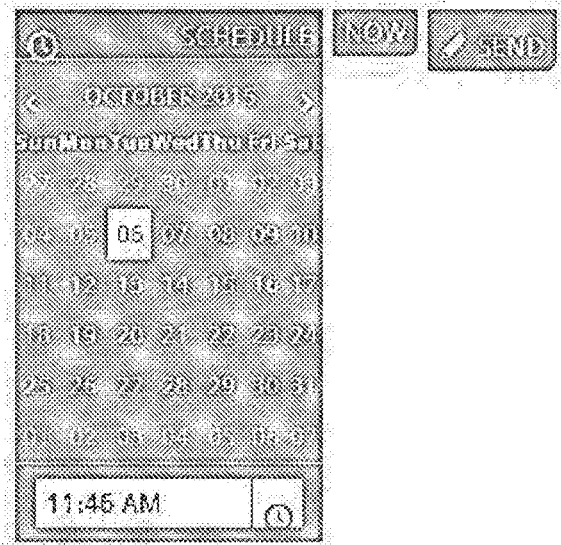

The message history 118 is a conversation comprised of the program messages sent by the application 120a-120c, replies from the participant 122, and ad-hoc messages users have sent to the participant individually 124. Each message in the conversation is annotated with the following information: direction (inbound/outbound), sent/received time, the sender, and whether or not the message has been flagged. Any user with rights to a participant is able to send them an SMS message via the web application. In FIG. 13, a user is able to create a message 128 (following up to the last outbound message 126) and can further schedule the message for a future date and time.

FIGS. 14-23 are screenshots of the message management interface further illustrating a workflow of a user being alerted to an ambiguous or otherwise unrecognizable participant response and the user further inferring intent of the participant. As previously described, the platform 12 is configured to account for student responses and the data associated therewith, which can trigger automatic pre-programmed follow-ups and/or alert users to intervene if an incoming message is unclear. For example, in some instances, a student's response text message may be unclear, in that their response does not fall within the confines of the allowable (or recognizable) response (e.g., yes, no, etc.). Accordingly, the web-based interface provides such unclear responses for one or more users to review and specify the student's intent.

Figure 14:
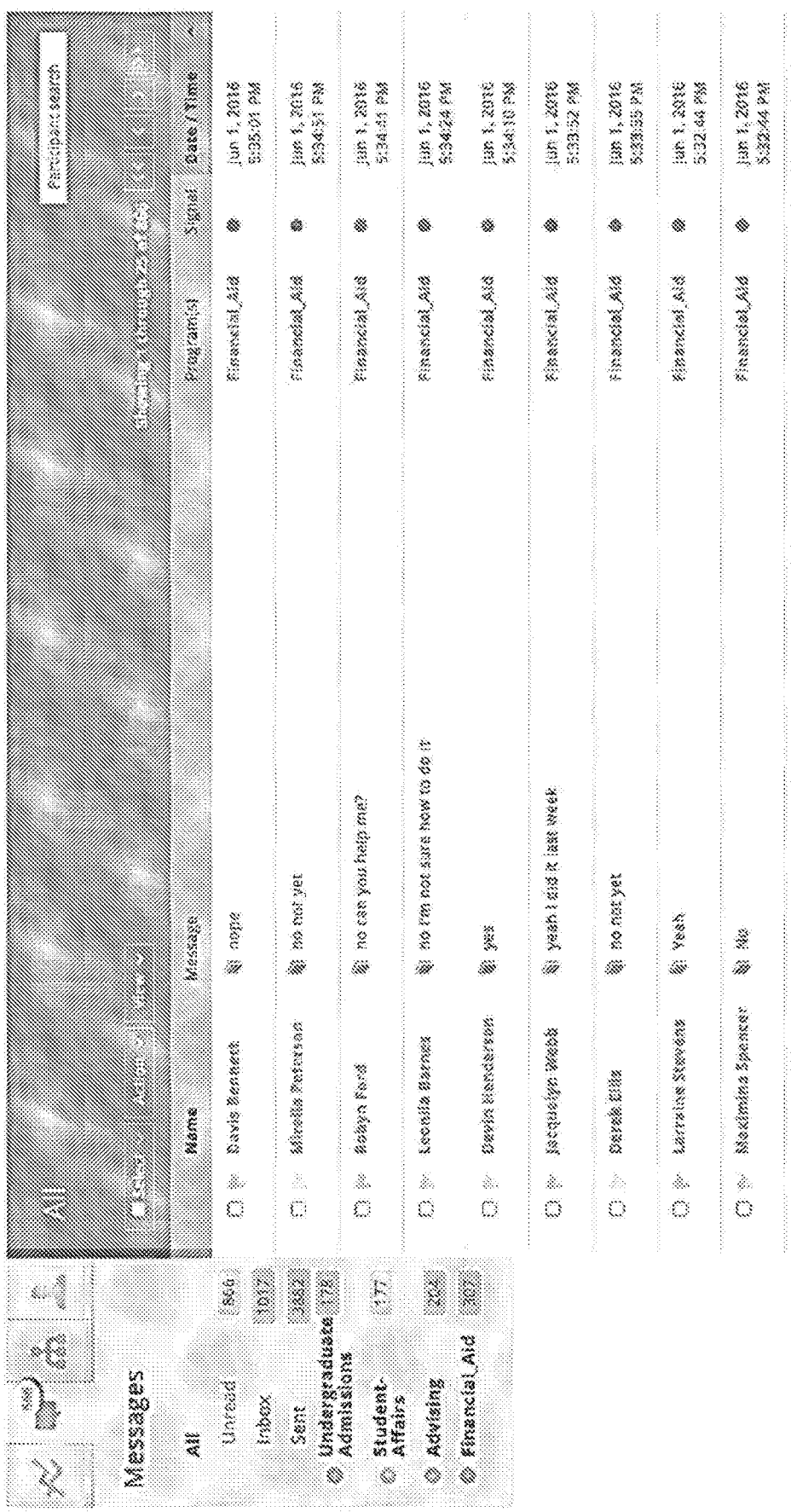

For example, as shown in FIG. 14, a response from student Leonila Barnes includes the expression "no I'm not sure how to do it", which may not be recognized as an acceptable response. Accordingly, this response was flagged, or otherwise marked, so as to alert the associated user and require their intervention to infer the student's intent, as the system does not understand this expression.

Figure 15:
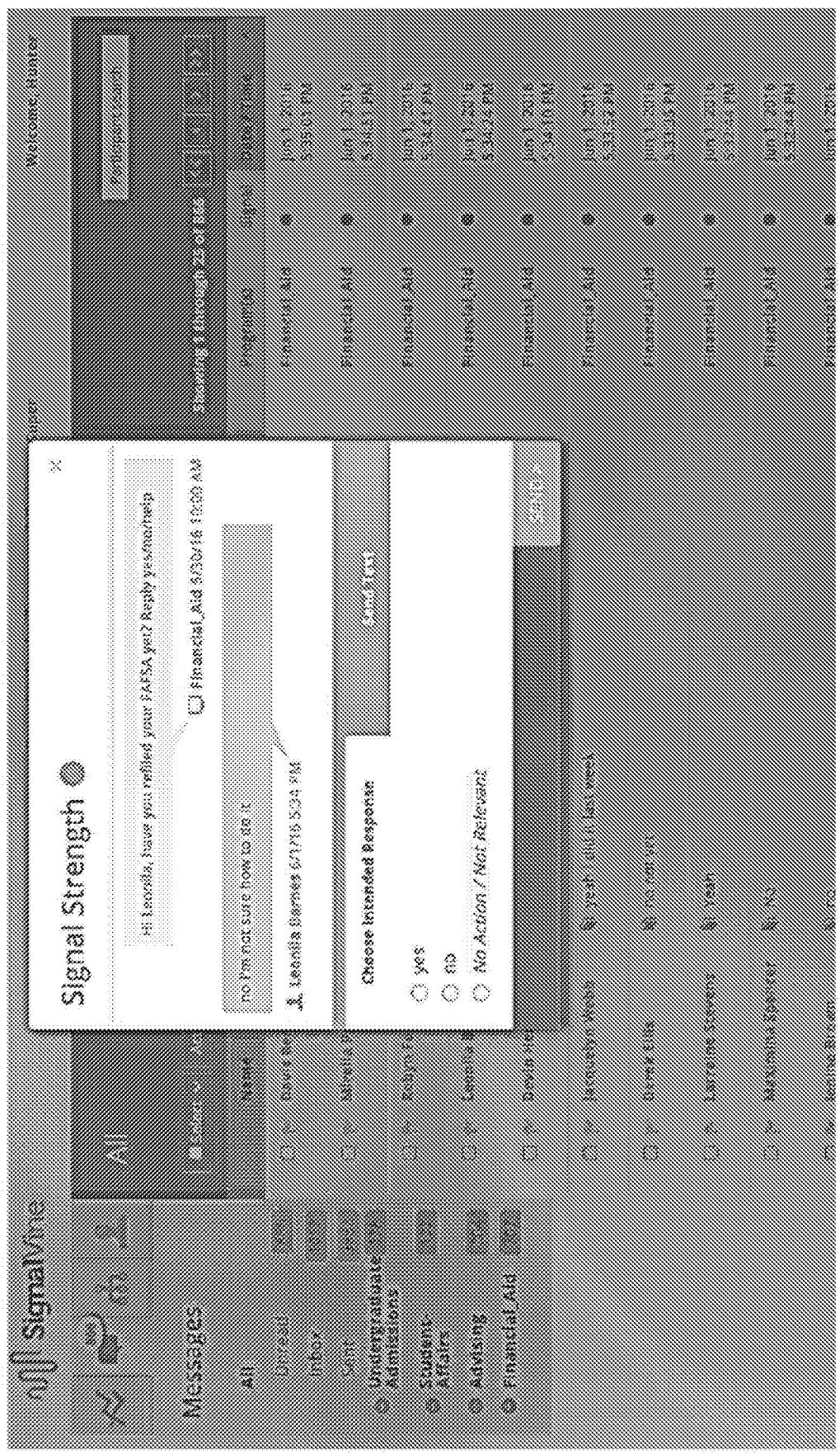
Figure 16:
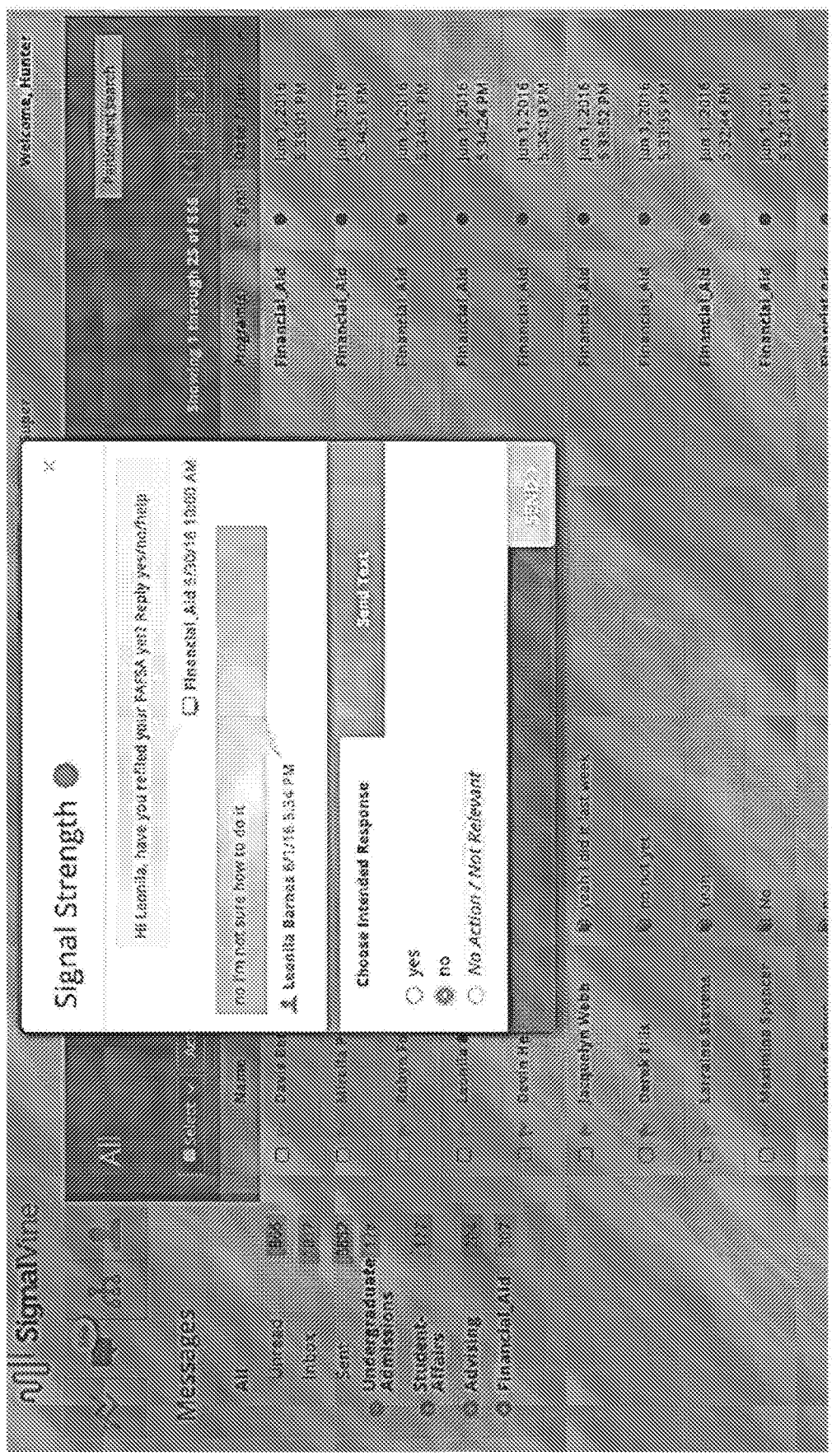
Figure 17:

As shown in FIG. 15, at this point, a user may click on the action required link, which may populate information related to the outbound message eliciting the response and the acceptable responses (e.g., yes, no, or no action/not relevant). The user may further choose the intended response by reviewing the student's expression "no I'm not sure how to do it" and inferring that the student meant "no" (see FIG. 16). Upon selecting the intended response, the system updates and now the message status has been determined, based on the user's inferred intent (see FIG. 17), removing the alert.

Figure 18:
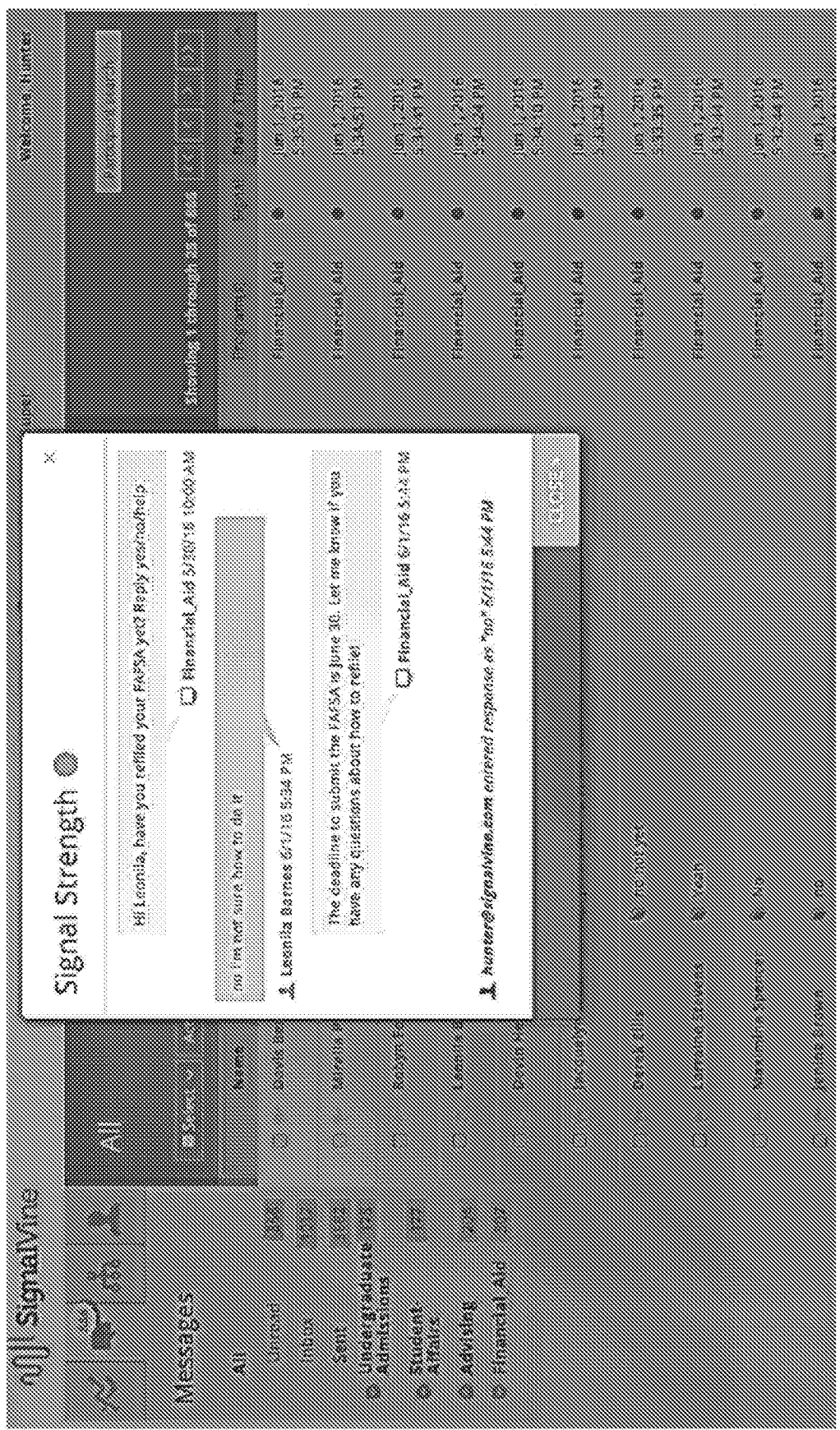

Additionally, or alternatively, the user may decide to directly contact the student with a message so as to confirm the student's intent and/or follow up to the student's question. For example, as shown in FIG. 18, the user may compose a simple text message in which the user is responding to the student's expression "no I'm not sure how to do it" by sending a reminder and further asking if the student requires any answers.

Figure 19:

In a similar example, as shown in FIG. 19, a response from student Jacquelyn Webb includes the expression "yeah I did it last week", which, again, may not be recognized as an acceptable response. Accordingly, this response was flagged, or otherwise marked, so as to alert the associated user and require their intervention to infer the student's intent, as the system does not understand this expression.

Figure 20:
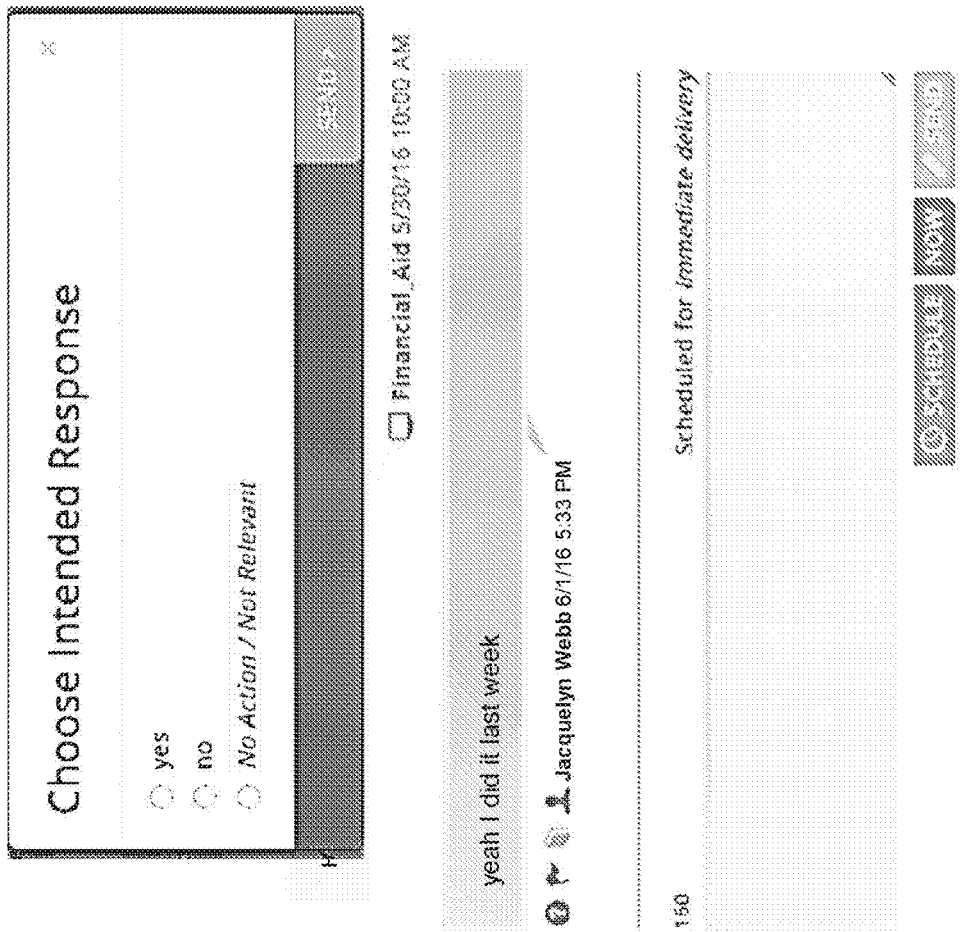
Figure 21:
Figure 22:
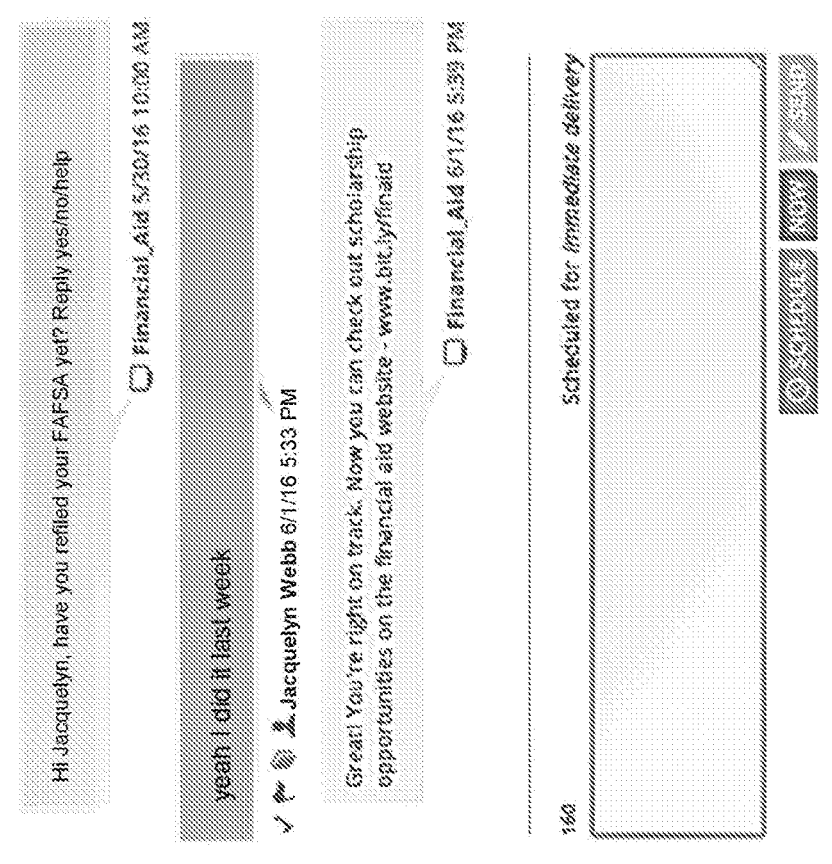
Figure 23:
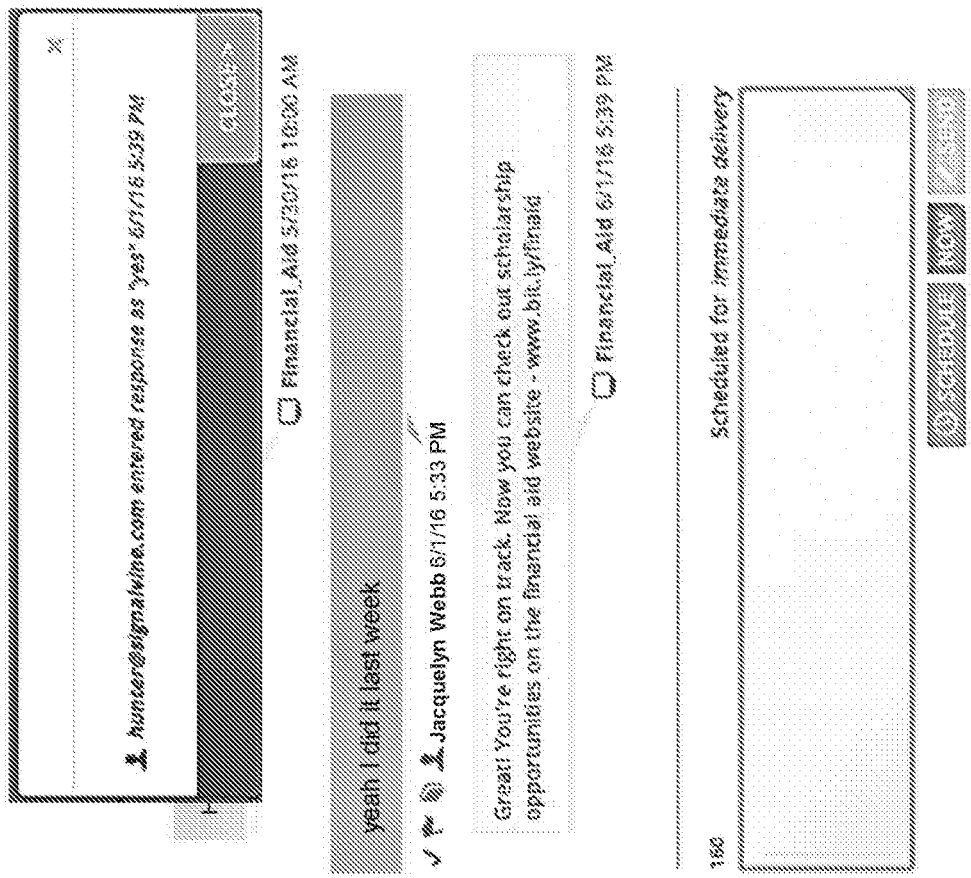
Figure 24:
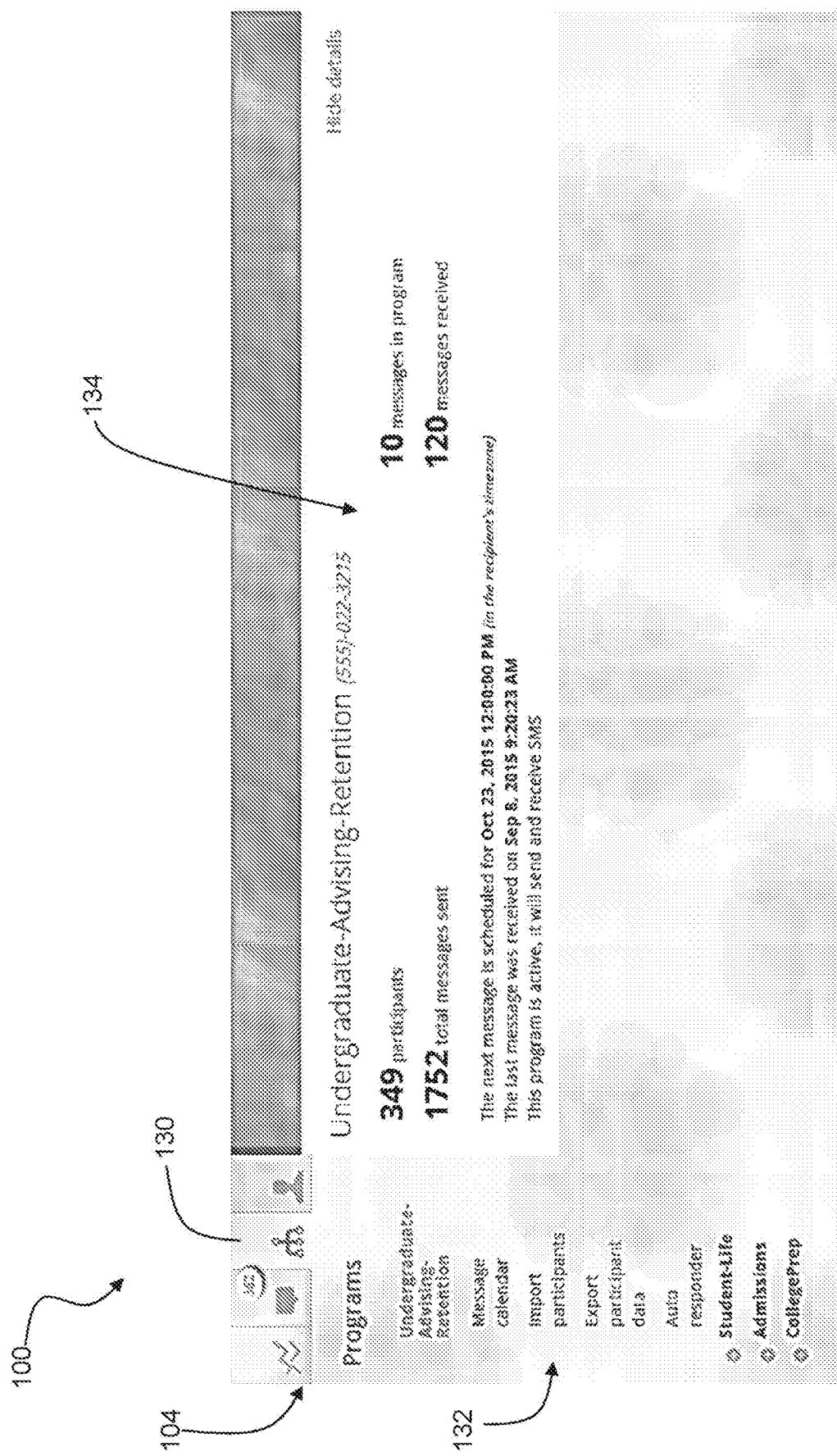
FIGS. 24-28 are screenshots of the user interface provided by the platform illustrating the workspace portal including a program interface for providing users with the ability to view and/or interact with school related programs and their associated automated outbound messages and/or automated responses scheduled for delivery to targeted participants within specific programs.

As shown in FIG. 20, at this point, a user may click on the action required link, which may populate information related to the outbound message eliciting the response and the acceptable responses (e.g., yes, no, or no action/not relevant). The user may further choose the intended response by reviewing the student's expression "yeah I did it last week" and inferring that the student meant "yes" (see FIG. 21). Upon selecting the intended response, the system updates and now the message status has been determined, based on the user's inferred intent (see FIG. 23), thereby removing the alert. Again, as shown in FIG. 22, the user may decide to directly contact the student with a message, to thereby confirm the student's intent and/further provide any additional information to the student. For example, as shown in FIG. 22, the user may compose a simple text message in which the user acknowledges the student's response and further directs the student to additional information that they may need.

The platform may include machine learning and /or natural processing technologies so as to learn and subsequently infer intent for future incoming text messages from the participant, based on the user's intervention for any unclear text messages. Accordingly, rather than being limited to a fully automated response system, the platform of the present invention provides a hybrid-like response approach which combines the benefits of an automated process with the insight of a human.

Figure 25:
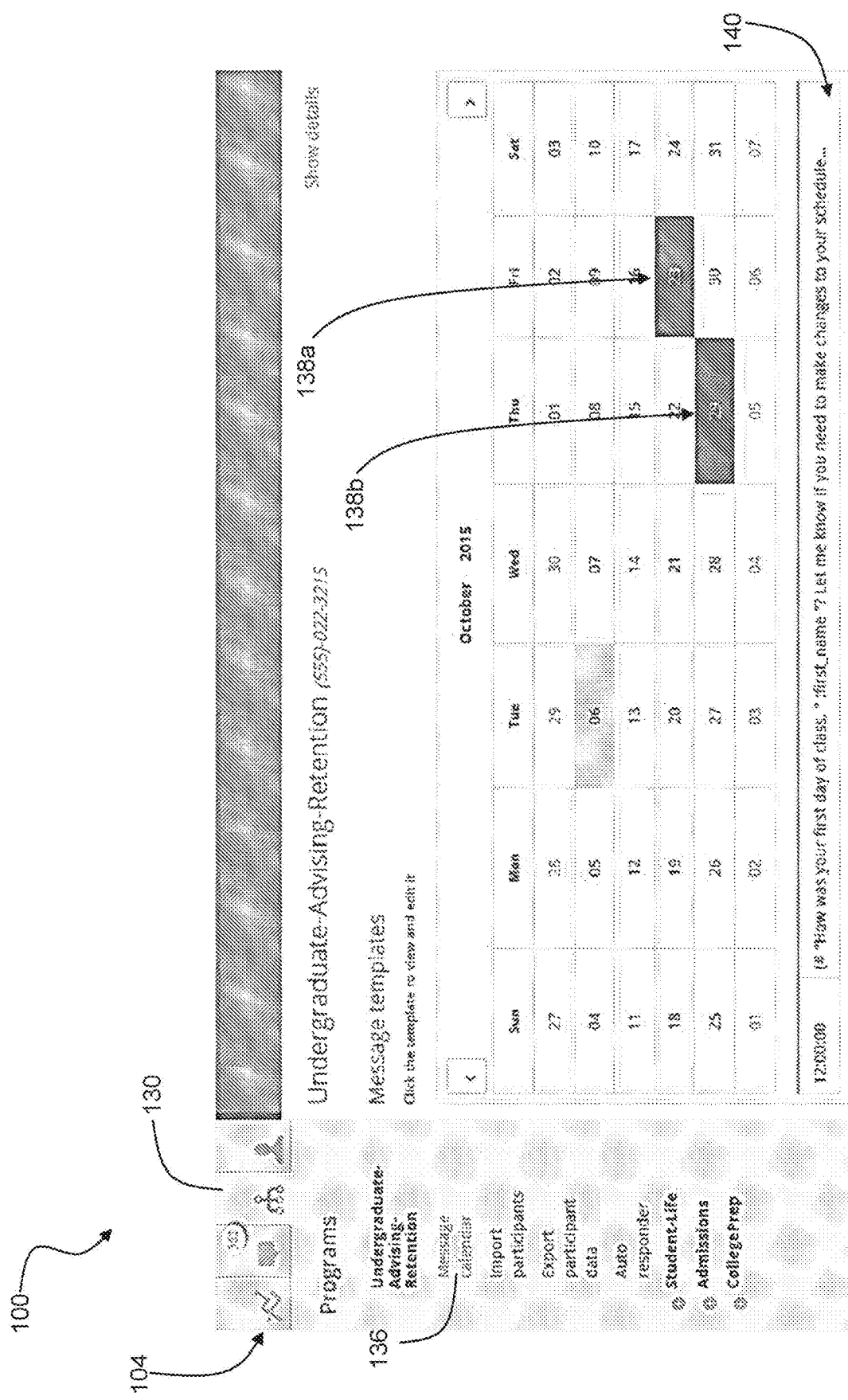
Figure 26:
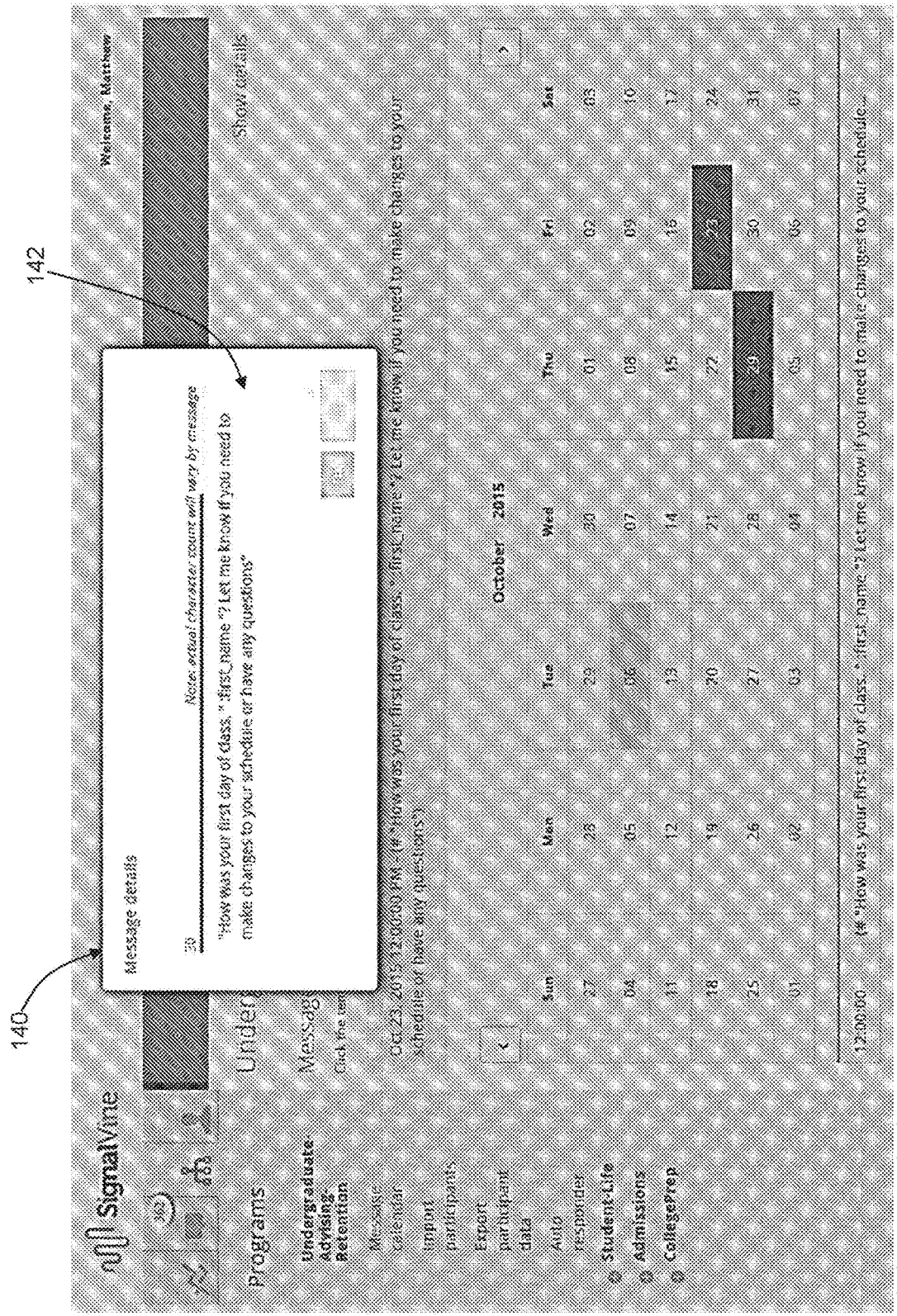
Figure 27:
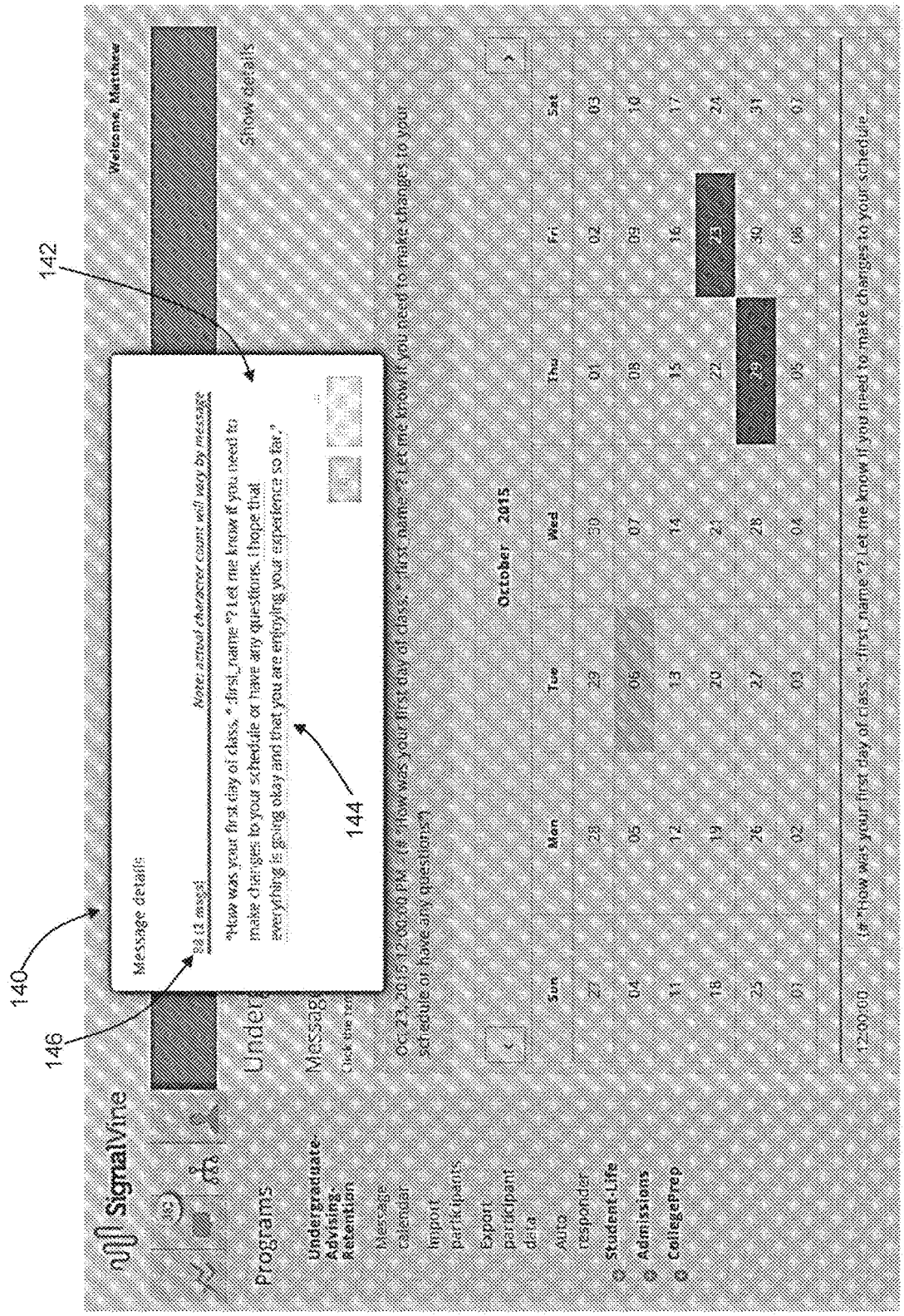

FIGS. 24-28 are screenshots of the portal 100 illustrating a program interface for providing users with the ability to view and/or interact with school related programs 130 and their associated automated outbound messages and/or automated responses 132 scheduled for delivery to targeted participants within specific programs. When a user initially logs into the school-related program 130 interface, they are presented with details 134 associated with the program. The user can then further select from a group of tools 132, including a message calendar, importing participants (ability to invite and gather data from participants), exporting participant data, and the auto responder tool. FIG. 25 illustrates selection of the message calendar 134 feature. Users can view a list of messages scheduled for a participant. This list includes both program messages, and ad-hoc messages that users have scheduled for the given participant (see 138a, 138b). Users can view the initial set of messages, indicated by arrow 140, that comprised the messaging program in a calendar view 134. As shown in FIG. 26, a user can view the message details 142. These messages can be edited and deleted, as shown in FIG. 27. For example, a user may include additional content to the message, indicated by arrow 144. It should be noted that the platform 12 includes a text character widget configured to provide the user with a visual count of characters in the message and further provide an indication of when the user exceeds the standard 160-character limit, as indicated by arrow 146. The widget is unique in that it further calculates the additional characters over the 160-character limit and outputs and indication of the number of separate text messages that will be sent so as to cover the entire message (which exceeds the single message 160-character limit).

Figure 28:
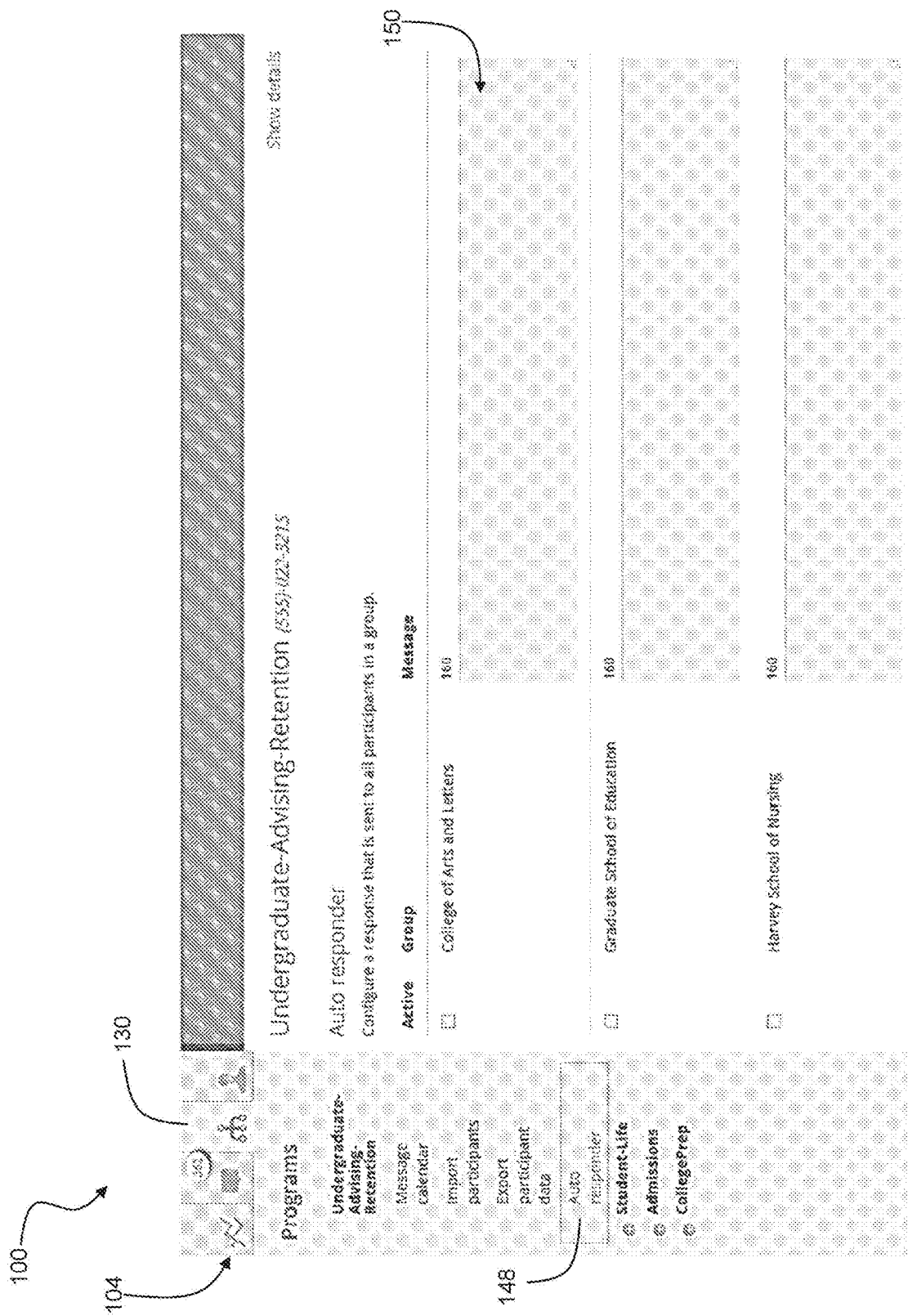

FIG. 28 illustrates selection of the auto responder feature 148. Depending on the access level of the user, an automated response to an incoming response from a student may be created. The user may be able to create an outbound message to be sent to all participants in a particular group, utilizing the field box 150 and can further schedule the message for a future date and time.

Figure 29:
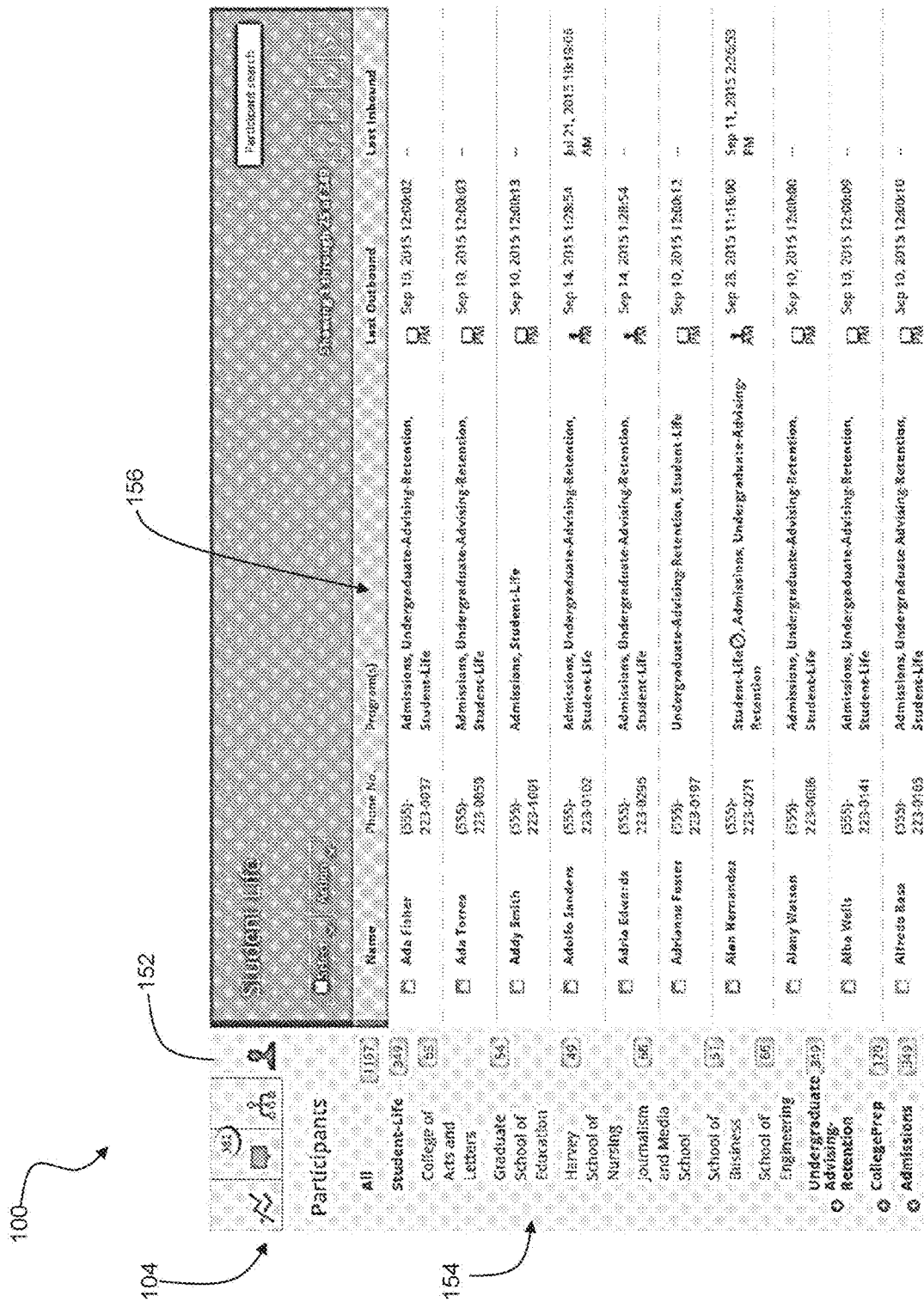
FIGS. 29-31 are screenshots of the user interface provided by the platform illustrating the workspace portal including a participant interface for providing users with the ability to view and/or manipulate data within specific participant profiles, as well as personalize and schedule an outbound text message targeted to specific participants.
Figure 30:
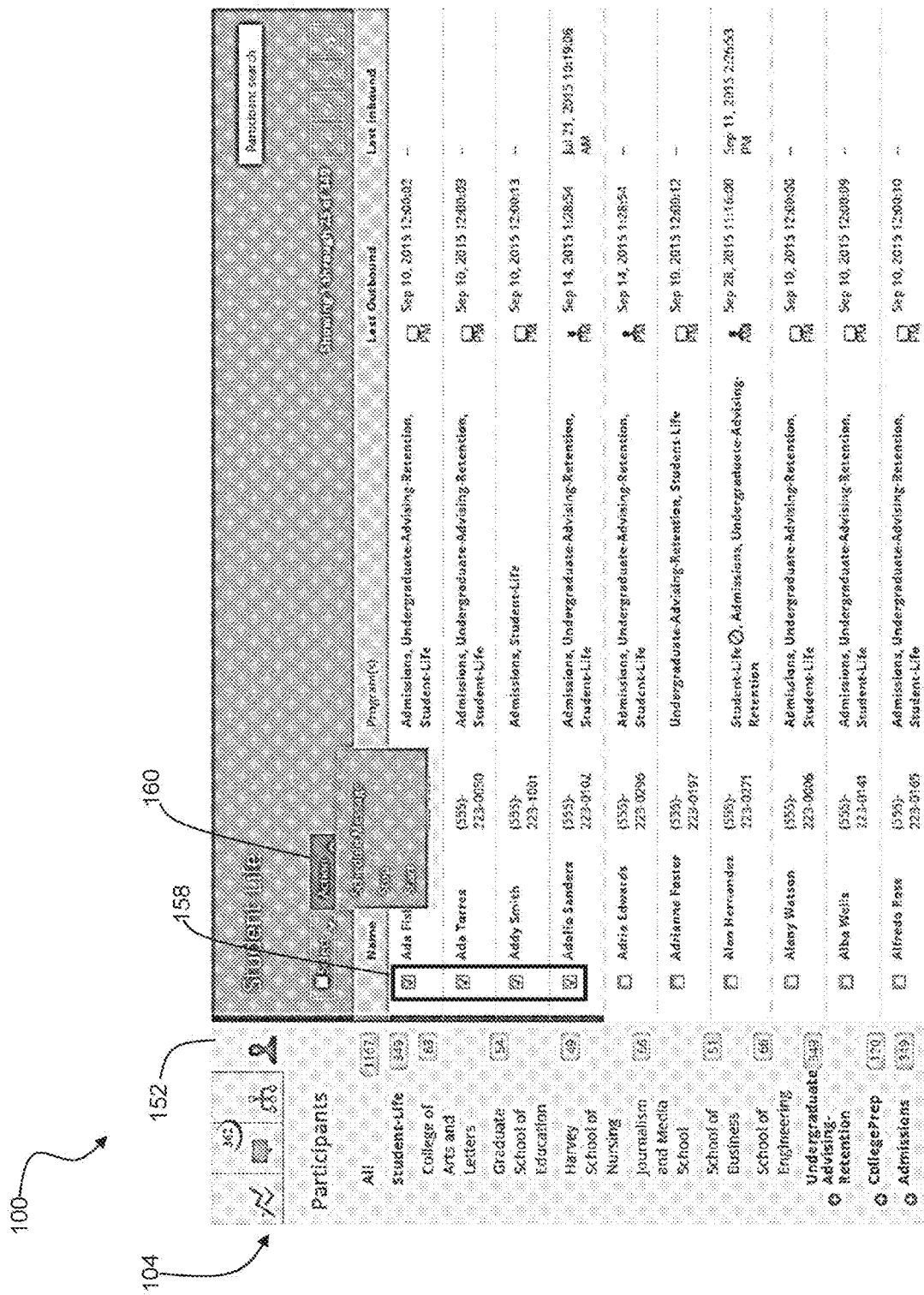
Figure 31:
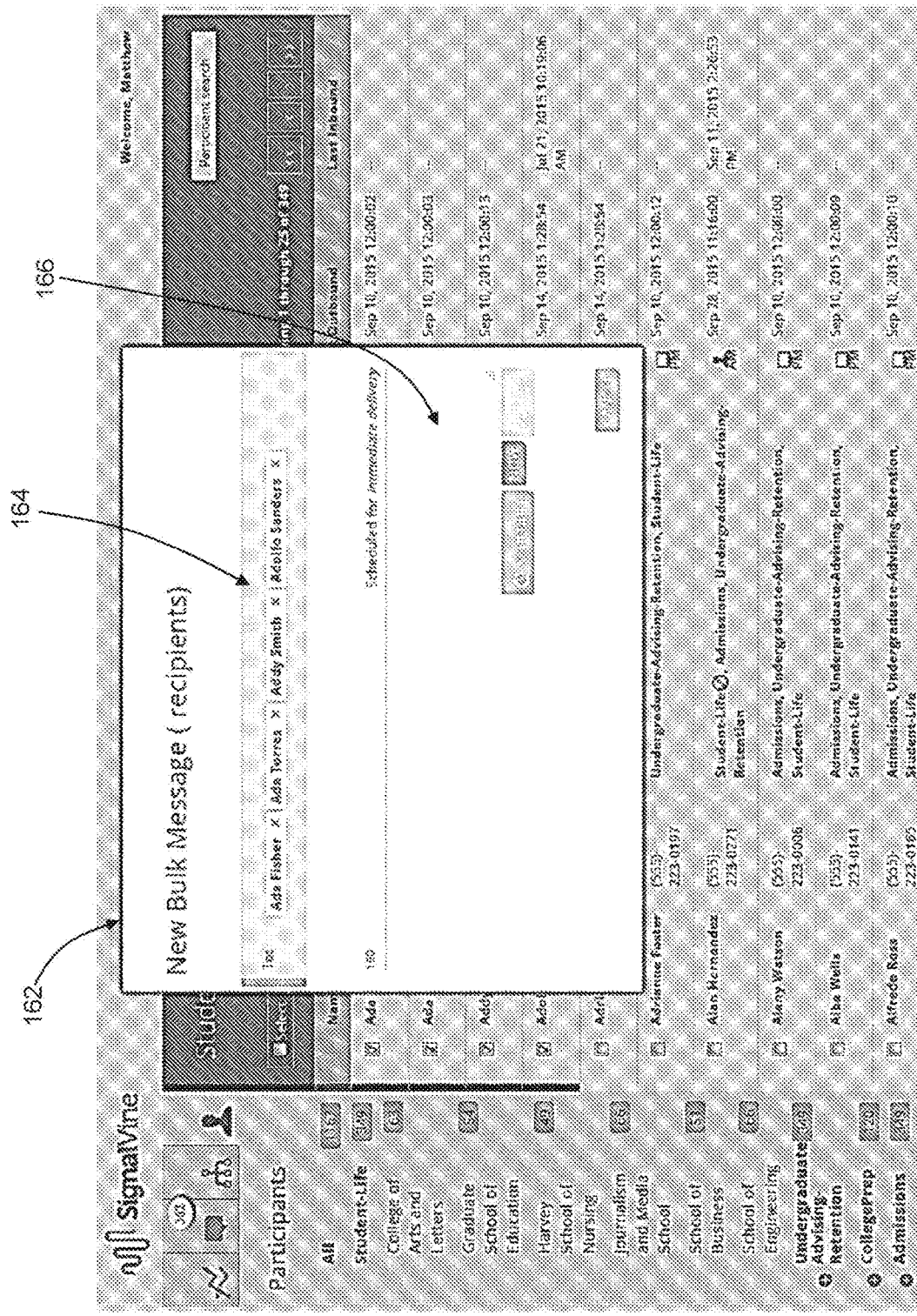

FIGS. 29-31 are screenshots of the portal 100 illustrating a participant interface 152 for providing users with the ability to view and/or manipulate data within specific participant profiles, as well as personalize and schedule an outbound text message targeted to specific participants. As shown in FIG. 29, a user can filter between participants based on the program 154 to which the participants are assigned, thereby presenting a list of associated participants 156. As shown in FIG. 30, the user may then select a specific set of participants, indicated by arrow 158, and further utilize an action tool 160 so as to schedule a message to be sent to those selected participants. Referring to FIG. 31, a bulk outbound message 162 may be sent to the selected participants 164, wherein the user may compose the content of the message 166 and further schedule the message to be sent, either immediately or at a future date and time.

Figure 32:
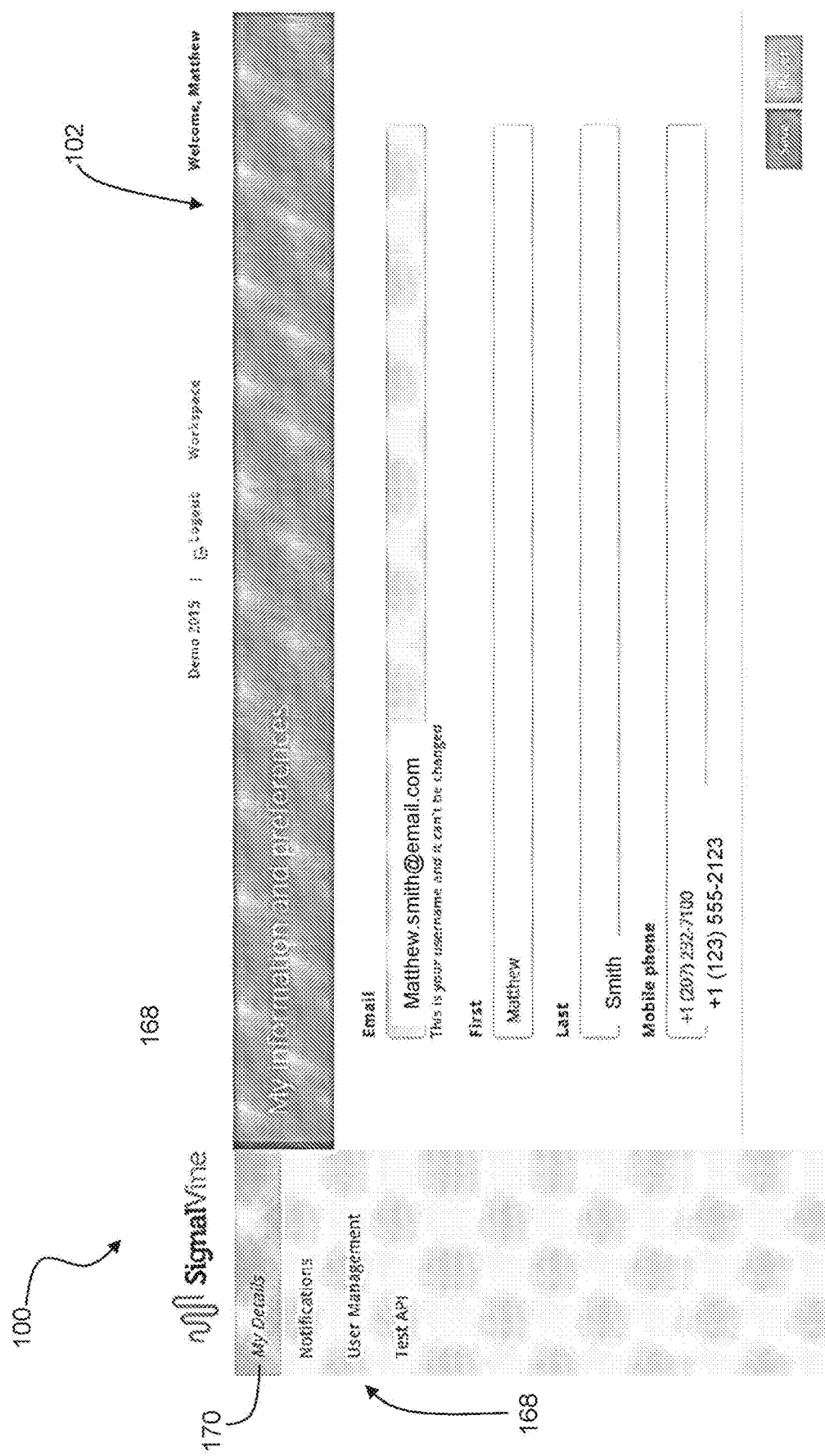
FIGS. 32-38 are screenshots of the user interface provided by the platform illustrating the tools portal including a user management features for allowing users with administrative capabilities to manage user access to the platform, including creation, deletion, and editing of user profiles.
Figure 33:
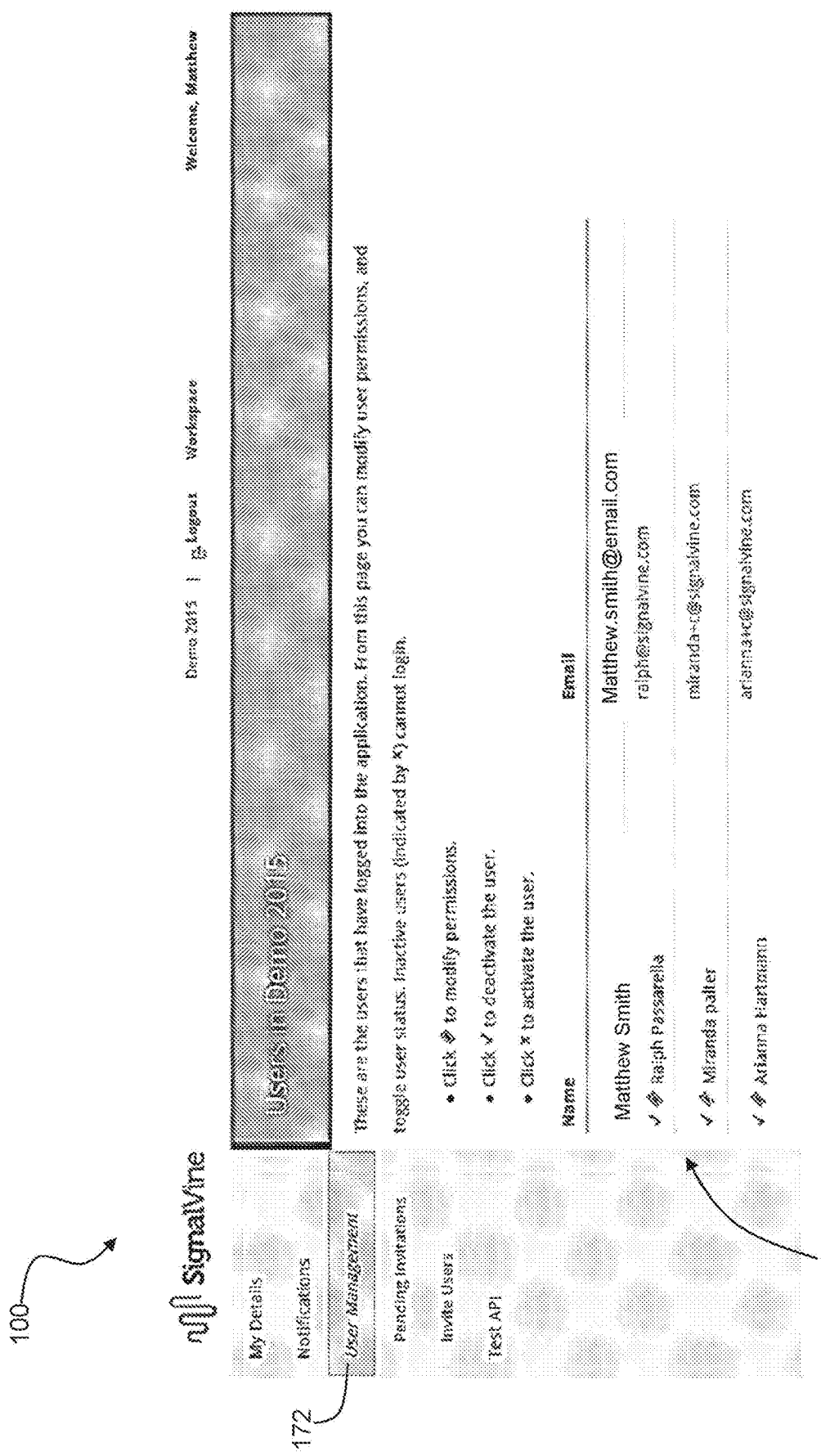
Figure 34:
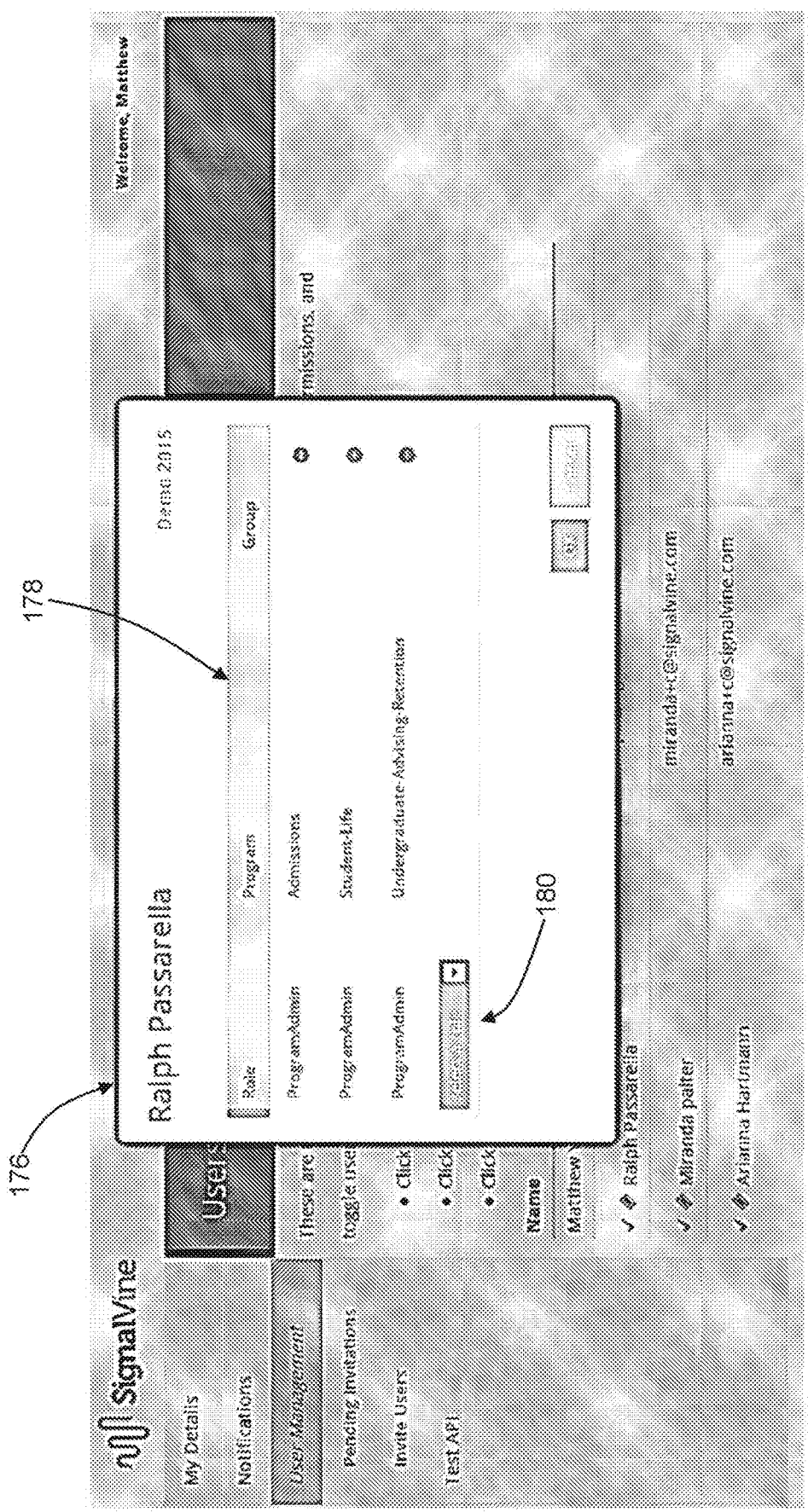
Figure 35:
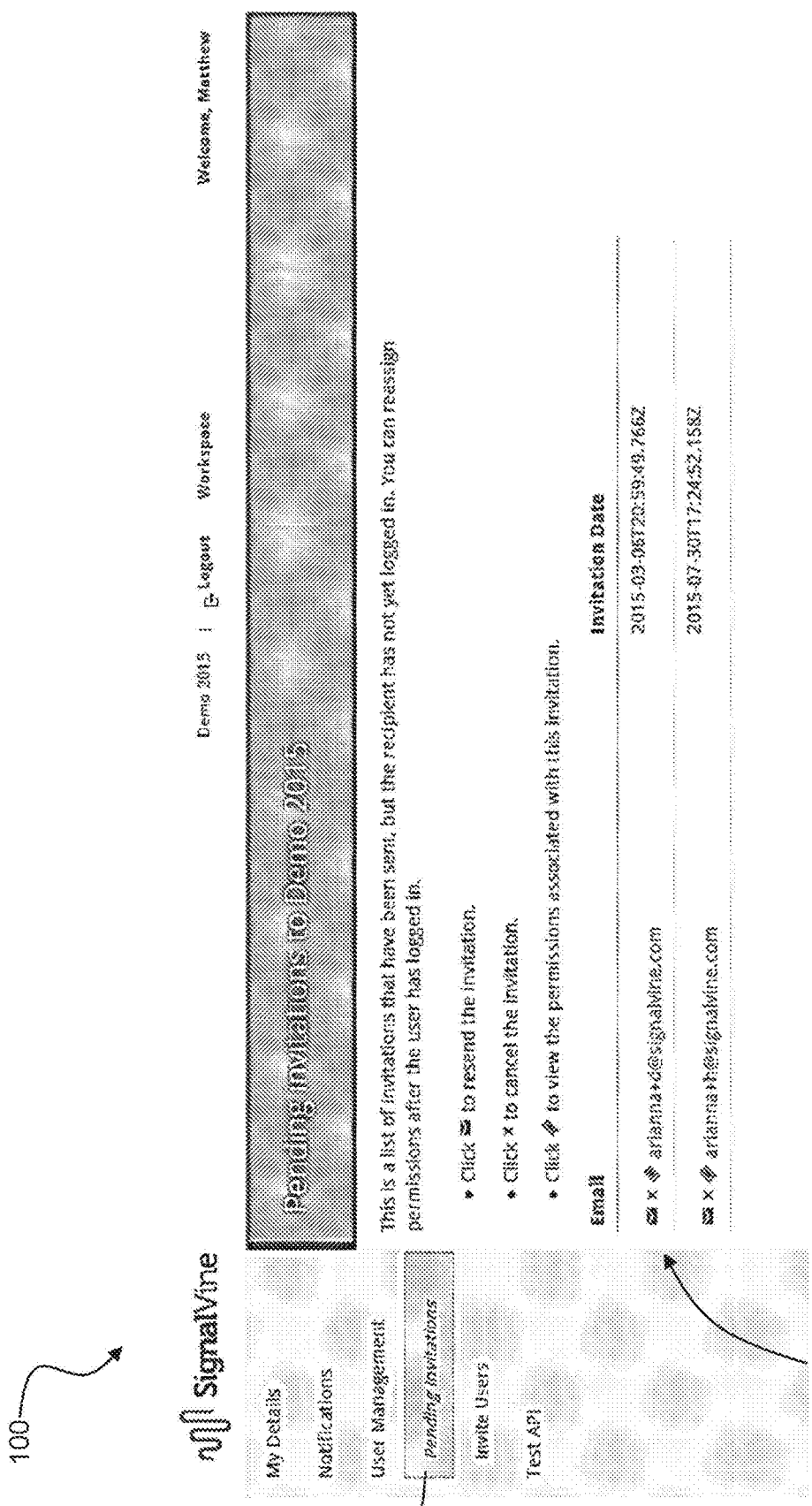
Figure 36:
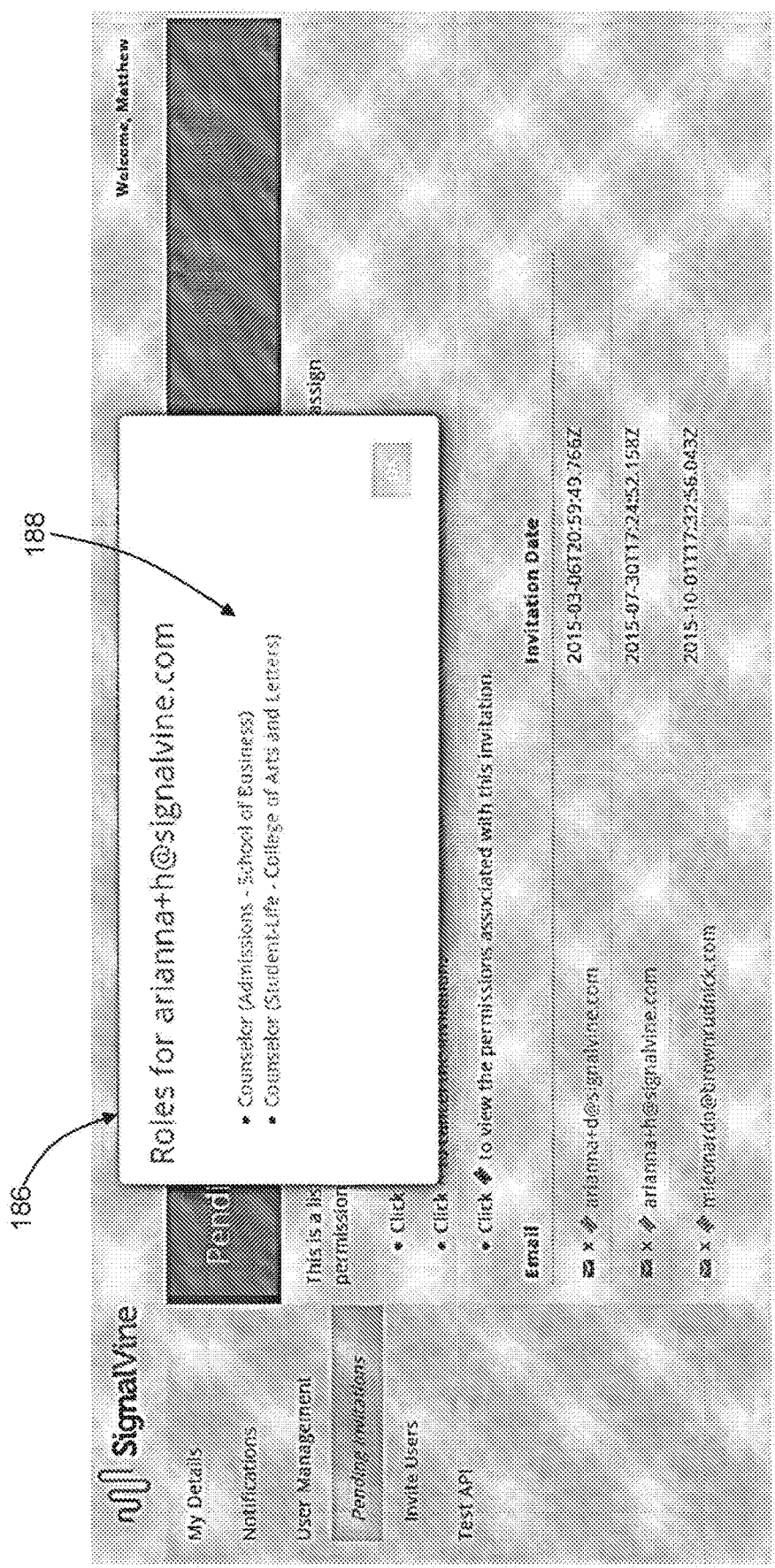
Figure 37:
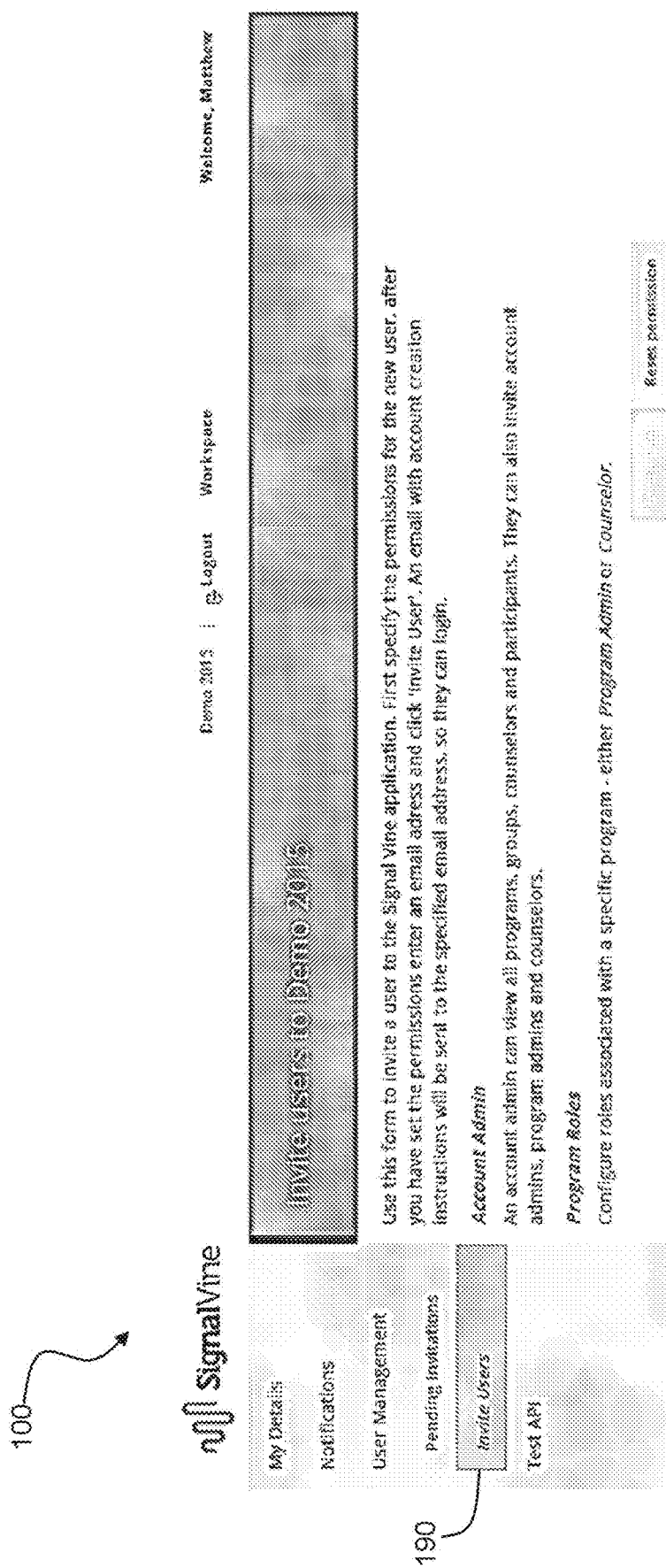
Figure 38:
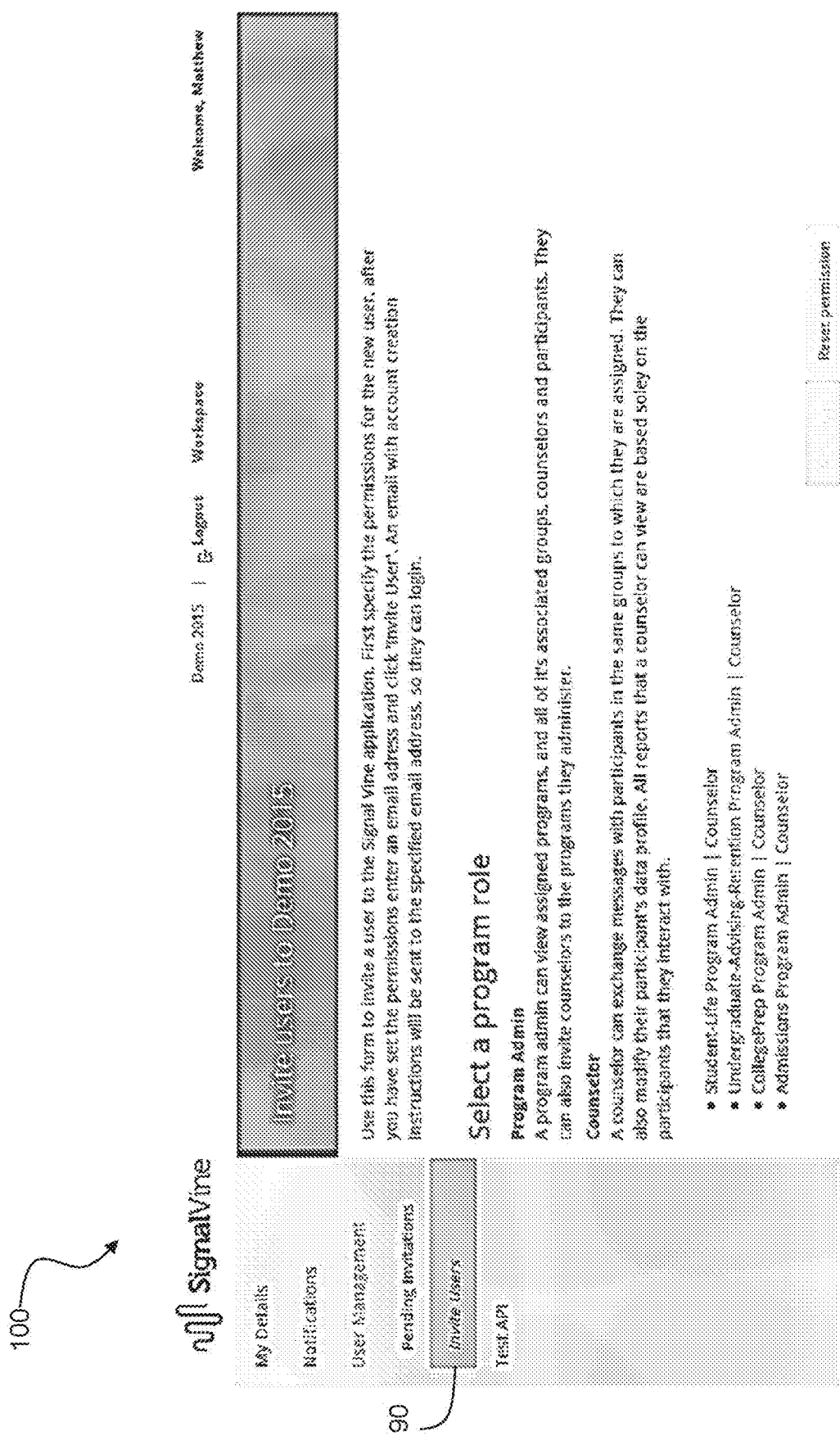

FIGS. 32-38 are screenshots of the portal 100 illustrating the tools interface including user management features 168 for allowing users with administrative capabilities to manage user access to the platform, including creation, deletion, and editing of user profiles. FIG. 32 illustrates the initial details 170 of the user currently logged into the interface 32. FIG. 33 illustrates selection of the user management feature 172, which allows for a user (having the appropriate level of clearance) to modify permission levels, or activate/deactivate users 174. FIG. 34 illustrates selection of a particular user 176 and a list of the permission levels 178 and further a tool 180 for modifying roles of the user. Within the user management feature 172, a user can select a pending invitations feature 182 to further review, or cancel invitations to users 184 not yet registered with the platform 112, as shown in FIG. 35. In FIG. 36, a user can select an invited user 186 and further review their proposed list of roles 188. As shown in FIG. 37, still within the user management feature 172, a user can select an invitation feature 190 to further invite new users to register with the platform 112. As shown in FIG. 38, during the invite process, specific roles for an invited user can be selected.

Figure 39:
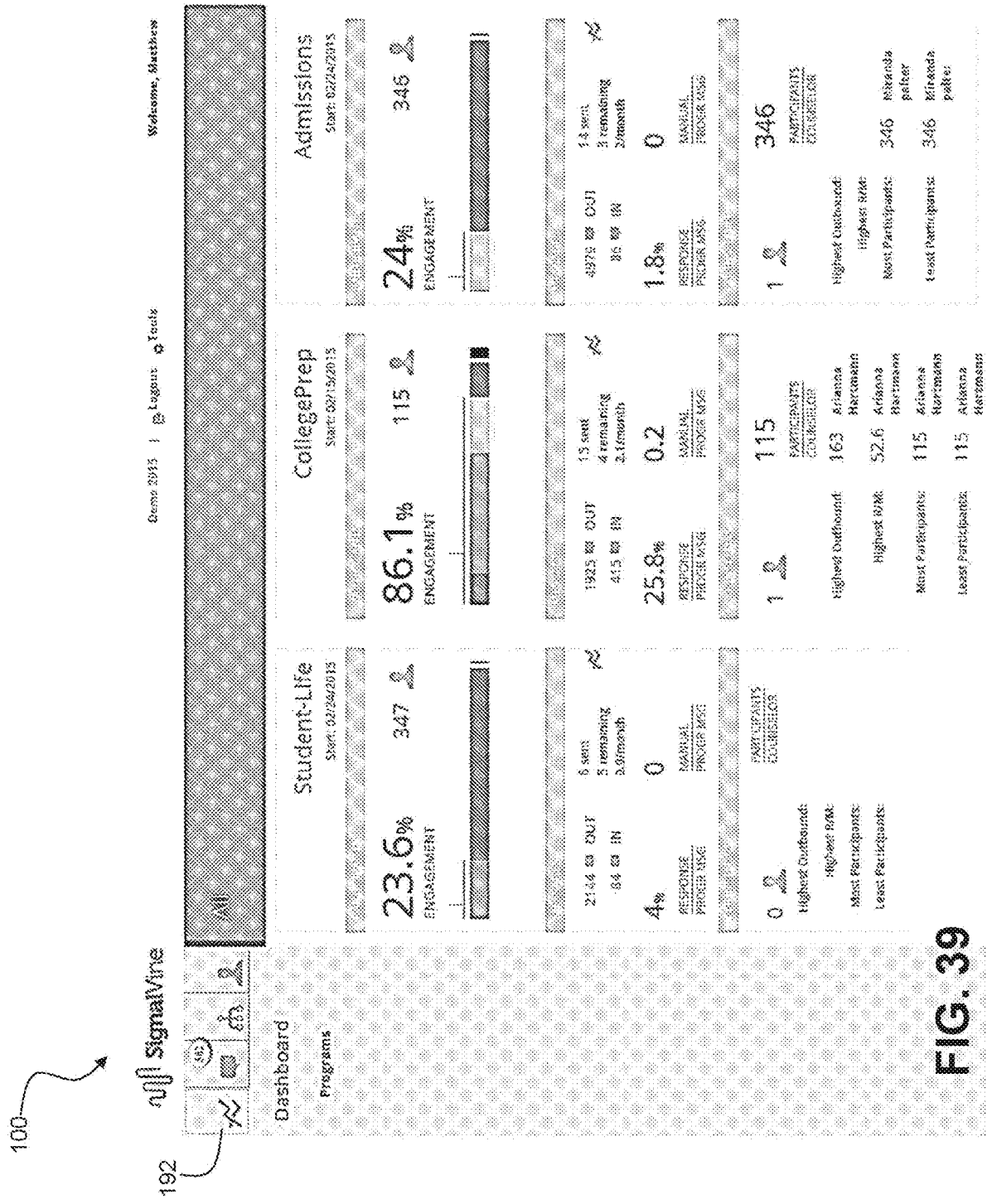

FIG. 39 is screenshot the portal 100 illustrating a dashboard interface 192 for providing metrics related to participant engagement and the like. As a complement to the powerful messaging capabilities, the platform 12 is configured to provide reports for users on the activity, results, and outcomes of programs and messages. The dashboard interface 192 includes standard messaging metrics such as the number and type of messages by date and program, participants, unique participant responses, response rates, and average response time. Program administrators can export participant data, and dashboard metrics from the system.

The SMS communication management platform 12 of the present invention provides numerous benefits. The platform 12 is configured to for mass engagement via text messaging by allowing the transmission of personalized messages to participants to encourage maximum engagement with the sender. The two-way messaging provided by the platform 12 allows clients/customers (e.g., businesses, organizations, etc.) to maximize their staff resources, and ensure participants can get the answers they need. The platform 12 is particularly well suited in situations in which participant engagement is crucial, such as in the instance of college and/or career counseling services targeting prospective students (e.g., high school juniors and/or seniors) or current students. The message creation and management systems offered by the platform 12 makes sure each message is meaningful to the individual student, allowing counselors to engage at the right time with those who need the help the most. Furthermore, the unique web-based interface provides user-specific portals or workspaces with unique security and student provisioning through which they can interact with the students they work with.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry.

Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions. Other embodiments may be implemented as software modules executed by a programmable control device. The storage medium may be non-transitory.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

What is claimed is:

1. A system for providing intuitive, semi-automated management of communication data received from one or more mobile devices over a large-scale two-way communications platform, the system comprising:
  a server configured to manage inbound and outbound communications between users associated with a client or customer and participants registered with a service provided by the client or customer, the server comprising a hardware processor coupled to non-transitory, computer-readable memory containing instructions executable by the processor to cause the server to:
    provide a web-based platform having an interface with which one or more authorized users associated with the client or customer can interact for the management of one or more campaigns instituted by the client or customer, wherein the interface allows an authorized user to manage text message communications transmitted to and received from a mobile device of a targeted one of a plurality of participants associated with the campaign;

generate, based on a first set of user input with the interface, one or more outbound communication messages to be transmitted to the mobile device of the targeted participant;

receive, in response to an outbound communication message, an incoming communication message from the mobile device of the targeted participant to which the outbound communication message was delivered, wherein the outbound communication message comprises data including a question or request for an answer or information from the participant and the incoming communication message comprises data including an answer or information in response to the question or information request of the outbound communication message;

process, by an automated response system of the platform, the incoming communication message to determine if the answer or information is an allowable response to the question or information request of the outbound communication message that is understood by the automated response system;

when the answer or information is understood by the automated response system as an allowable response to the question or information request of the outbound communication message, automatically determine, by the automated response system, one or more actions to be taken based on the allowable response;

when the answer or information is not understood by the automated response system as an allowable response to the question or information request of the outbound communication message, route the incoming communication message to an inbox provided in the web-based interface to allow an authorized user to review the incoming communication message and further implementing (a) a first mode allowing the authorized user to reply directly to the incoming communication message without actively directing the automated response system of the platform to perform one or more actions associated with the incoming communication message data, (b) a second mode allowing the authorized user to actively direct the automated response system of the platform to perform one or more actions associated with the incoming communication message data without directly replying to the incoming communication message, and (c) a third mode allowing the authorized user to both reply directly to the incoming communication message and actively direct the automated response system of the platform to perform one or more actions associated with the incoming communication message data, to provide for semi-automated response to the incoming communication message; and when the automated response system determines one or more actions to be taken based on the allowable response or is actively directed by the authorized user to perform one or more actions associated with the incoming communication message, perform, by the automated response system of the platform, the one or more actions including at least updating a participant profile stored in a participant database and determining whether to send one or more additional outbound communication messages in response to the incoming communication message.

2. The system of claim 1, wherein determining whether to send one or more additional outbound communication messages in response to the incoming communication message comprises analysis of the updated participant profile.

3. The system of claim 1, wherein the one or more actions comprises enrolling or un-enrolling the targeted participant in a program.

4. The system of claim 1, wherein the one or more actions comprises sending an outbound communication message to at least one of the targeted participant or a participant other than the targeted participant.

5. The system of claim 1, wherein the incoming communication message is processed in accordance with a set of rules specified for the outbound communication message that define acceptable answers or information in response to the question or information request of the outbound communication message.

6. The system of claim 1, wherein the server is configured to:
determine whether all requested participant data or a portion of the requested participant data has been received;
automatically remove the participant from a list of targeted participants if all requested participant data has been received; and
automatically schedule the transmission of one or more outbound communication messages to the mobile device of the targeted participant to elicit additional participant response if a portion of the participant data has been received.

7. The system of claim 1, wherein the one or more actions comprise joining or leaving a security group.

8. The system of claim 1, wherein the one or more actions comprise determining whether the targeted participant may have access to specific data that the targeted participant is attempting to access.

9. The system of claim 1, wherein the system runs a set of handlers to process the incoming communication message.

10. The system of claim 9, wherein the set of handlers includes at least one global handler and at least one message-specific handler.

11. The system of claim 1, wherein the incoming and outbound communication messages are text messages.

12. The system of claim 11, wherein the server is configured to transmit and receive the text messages via a short message service (SMS).

13. The system of claim 1, wherein at least one of the incoming and outbound communication messages comprises at least one data file selected from the group consisting of: an image file, a video file, an audio file, a document file, and a combination thereof.

14. The system of claim 13, wherein the server is configured to receive or transmit the incoming and outbound communication messages, respectively, via a multimedia messaging service (MMS).

15. The system of claim 1, wherein the server is configured to analyze the incoming communication message data and to route the incoming communication message to the inbox provided in the web-based interface when the incoming communication message data is unclear.

16. The system of claim 15, wherein the server flags incoming communication message to indicate that the incoming communication message data is unclear.

17. The system of claim 15, wherein the server is configured to learn from user intervention relating to the incoming communication message data.

18. A method for providing intuitive, semi-automated management of communication data received from one or more mobile devices over a large-scale two-way communications platform including a server configured to manage inbound and outbound communications between users associated with a client or customer and participants registered with a service provided by the client or customer, the server comprising a hardware processor coupled to non-transitory, computer-readable memory containing instructions executable by the processor, the method comprising:

providing, by the server, a web-based platform having an interface with which one or more authorized users associated with the client or customer can interact for the management of one or more campaigns instituted by the client or customer, wherein the interface allows an authorized user to manage text message communications transmitted to and received from a mobile device of a targeted one of a plurality of participants associated with the campaign;

generating, by the server, based on a first set of user input with the interface, one or more outbound communication messages to be transmitted to the mobile device of the targeted participant;

receiving, by the server, in response to an outbound communication message, an incoming communication message from the mobile device of the targeted participant to which the outbound communication message was delivered, wherein the outbound communication message comprises data including a question or request for an answer or information from the participant and the incoming communication message comprises data including an answer or information in response to the question or information request of the outbound communication message;

processing, by an automated response system of the platform, the incoming communication message to determine if the answer or information is an allowable response to the question or information request of the outbound communication message that is understood by the automated response system;

when the answer or information is understood by the automated response system as an allowable response to the question or information request of the outbound communication message, automatically determining, by the automated response system, one or more actions to be taken based on the allowable response;

when the answer or information is not understood by the automated response system as an allowable response to the question or information request of the outbound communication message, routing, by the server, the incoming communication message to an inbox provided in the web-based interface to allow an authorized user to review the incoming communication message and further implementing (a) a first mode allowing the authorized user to reply directly to the incoming communication message without actively directing the automated response system of the platform to perform one or more actions associated with the incoming communication message data, (b) a second mode allowing the authorized user to actively direct the automated response system of the platform to perform one or more actions associated with the incoming communication message data without directly replying to the incoming communication message, and (c) a third mode allowing the authorized user to both reply directly to the incoming communication message and actively direct the automated response system of the platform to perform one or more actions associated with the incoming communication message data, to provide for semi-automated response to the incoming communication message; and when the automated response system determines one or more actions to be taken based on the allowable response or is actively directed by the authorized user to perform one or more actions associated with the incoming communication message, performing, by the automated response system of the platform, the one or more actions including at least updating a participant profile stored in a participant database and determining whether to send one or more additional outbound communication messages in response to the incoming communication message.

19. The method of claim 18, wherein the one or more actions comprises at least one of:

analyzing the updated participant profile to determine whether to send one or more additional outbound communication messages in response to the incoming communication message;

enrolling or un-enrolling the targeted participant in a program;

sending an outbound communication message to the targeted participant;

sending an outbound communication message to a participant other than the targeted participant;

automatically removing the participant from a list of targeted participants if all requested participant data has been received;

automatically scheduling the transmission of one or more outbound communication messages to the mobile device of the targeted participant to elicit additional participant response if only a portion of the participant data has been received;

joining or leaving a security group; or determining whether the targeted participant may have access to specific data that the targeted participant is attempting to access.

20. The method of claim 18, wherein processing the incoming communication message comprises analyzing the incoming communication message data, and wherein the incoming communication message is routed to the inbox provided in the web-based interface when the incoming communication message data is unclear.

* * * * *